US012799708B2

(12) United States Patent
Carlson et al.

(10) Patent No.: US 12,799,708 B2
(45) Date of Patent: Nov. 17, 2026

(54) WORK MACHINE DRIVE MOTOR MOUNTS

(71) Applicant: Great Plains Manufacturing, Inc., Salina, KS (US)

(72) Inventors: Jason Carlson, Lindsborg, KS (US); John M. Relph, Abilene, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 643 days.

(21) Appl. No.: 18/359,677

(22) Filed: Jul. 26, 2023

(65) Prior Publication Data

US 2025/0034838 A1 Jan. 30, 2025

(51) Int. Cl.

| | |
|---|---|
| ***E02F 9/08*** | (2006.01) |
| ***B60K 5/12*** | (2006.01) |
| ***B62D 55/06*** | (2006.01) |
| *E02F 3/34* | (2006.01) |
| *E02F 9/02* | (2006.01) |

(52) U.S. Cl.

CPC .............. *E02F 9/0866* (2013.01); *B60K 5/12* (2013.01); *B62D 55/06* (2013.01); *E02F 3/3414* (2013.01); *E02F 9/02* (2013.01)

(58) Field of Classification Search

CPC ...... B62D 55/06; B62D 55/12; B62D 55/125; B62D 55/32; B62D 65/024; B62D 65/10; B62D 55/13; B60K 5/12; B60K 7/0015; B60K 17/14; B60K 55/13; E02F 9/0866

USPC .......... 180/308, 9.1, 6.48; 172/831; 280/797

See application file for complete search history.

(56) References Cited

U.S. PATENT DOCUMENTS

| | | | | |
|---|---|---|---|---|
| 3,954,026 A * | 5/1976 | Rittmann | B60B 27/0047 | 188/78 |
| 4,962,821 A * | 10/1990 | Kim | E02F 9/202 | 180/242 |
| 4,962,825 A * | 10/1990 | Albright | E02F 9/0866 | 29/469 |
| 6,167,980 B1 * | 1/2001 | Anderson | B62D 21/186 | 180/311 |
| 7,815,000 B2 * | 10/2010 | Kisse | B62D 55/125 | 180/9.1 |
| 8,459,398 B2 * | 6/2013 | Iwaki | B60K 7/0015 | 180/308 |
| 9,650,088 B2 * | 5/2017 | Haar | B62D 55/04 | |
| 2005/0167969 A1 * | 8/2005 | Fukazawa | B62D 55/125 | 280/785 |

(Continued)

*Primary Examiner* — Anne Marie M Boehler
(74) *Attorney, Agent, or Firm* — Hovey Williams LLP; Kameron D. Kelly

(57) ABSTRACT

A work machine comprising a frame with a pair of spaced apart side panels separated by a bottom panel. The work machine additionally comprises a drive assembly configured to propel the work machine, with the drive assembly comprising at least one drive motor. The work machine further comprises a motor mount assembly configured to support the drive motor with respect to the frame. The motor mount assembly comprises a mounting flange and a reinforcement element. Each of the mounting flange and the reinforcement element includes an opening configured to receive a portion of the drive motor. The reinforcement element is secured to an interior surface of one of the side panels of the frame. The mounting flange is secured to the reinforcement element. And the drive motor is secured to the mounting flange.

17 Claims, 22 Drawing Sheets

(56) References Cited

U.S. PATENT DOCUMENTS

2010/0003117 A1* 1/2010 Yamashita ............ E02F 9/0883
296/190.04
2016/0059887 A1* 3/2016 Mackin .................. B62D 55/08
180/9.1
2024/0409168 A1* 12/2024 Balzer .................... B62D 55/06

* cited by examiner

WORK MACHINE DRIVE MOTOR MOUNTS

FIELD OF THE INVENTION

Embodiments of the present invention are generally directed to work machines. More particularly, embodiments of the present invention are directed to compact work machines, such as compact track loaders and/or compact utility loaders, which can carry and operate a wide range of attachments while maintaining a reduced operating footprint.

BACKGROUND OF THE INVENTION

Many types of work machines are on the market today. An exemplary type of work machine is a loader, which is a machine commonly used as a hydraulic tool carrier configured to carry and operate a variety of hydraulically-driven attachments (e.g., implements or tools). Common attachments include augers, trenchers, grapples, etc. Other non-hydraulic attachments may also be carried and operated by loaders, such as buckets, rakes, etc.

Unfortunately, most currently-available loaders are manufactured in large sizes (e.g., having large widths and lengths), which can make the loaders difficult to maneuver and operate. Although there are many jobs that can be efficiently performed by loaders, such as the excavation of building foundations and basements, many residential and commercial real-estate properties have narrow entryways/exits onto the properties. As such, most currently-available loaders are too large to pass through the entryways/exits to access the properties. As a result, there is a need for a work machine, and particularly for a compact loader, having a small, reduced footprint (e.g., length and/or width), so as to provide for improved maneuverability and accessibility within confined spaces.

Furthermore, it would be beneficial to provide such a reduced-footprint work machine that includes improved functionality and operating characteristics. For example, many work machines include drive systems/assemblies with hydraulic motors that power wheels or tracks. However, given that hydraulic motors generally have large sizes, it is difficult to incorporate such hydraulic motors into a reduced-footprint work machine (e.g., compact loaders). Thus, it would be beneficial to provide a reduced-footprint work machine with an improved motor mount configuration that allows for hydraulic motors to be incorporated with the work machine without taking up unnecessary space within (or outside of) the work machine. Furthermore, it would be beneficial if such a motor mount configuration provides enhanced structural reinforcement for supporting the hydraulic motors with respect to the remaining components of the work machine.

SUMMARY OF THE INVENTION

One aspect of the present invention concerns a work machine comprising a frame with a pair of spaced apart side panels separated by a bottom panel. The work machine additionally comprises a drive assembly configured to propel the work machine, with the drive assembly comprising at least one drive motor. The work machine further comprises a motor mount assembly configured to support the drive motor with respect to the frame. The motor mount assembly comprises a mounting flange and a reinforcement element. Each of the mounting flange and the reinforcement element includes an opening configured to receive a portion of the drive motor. The reinforcement element is secured to an interior surface of one of the side panels of the frame. The mounting flange is secured to the reinforcement element. And the drive motor is secured to the mounting flange.

Another aspect of the present invention concerns a method of assembling a work machine. The method comprises a step of securing a reinforcement element to an interior surface of a side panel of a frame of the work machine. An additional step includes securing a mounting flange to the reinforcement element. Each of the mounting flange and the reinforcement element includes a motor opening configured to receive a portion of a drive motor of the work machine. A further step includes securing the drive motor to the mounting flange.

BRIEF DESCRIPTION OF THE FIGURES

Embodiments of the present invention are described herein with reference to the following drawing figures, wherein.

Figure 1:
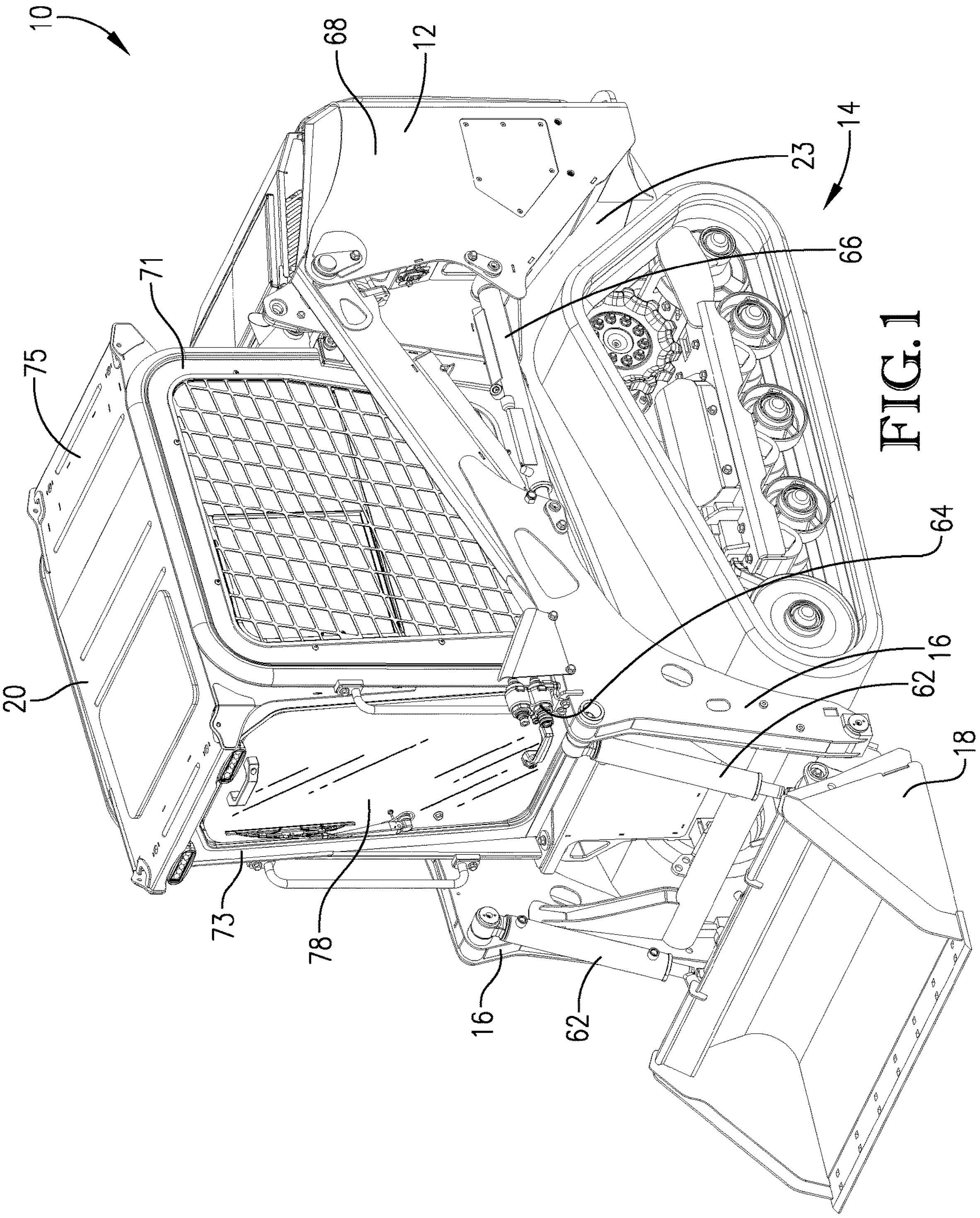
FIG. 1 is a front perspective view of a loader according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Overview

Figure 9:
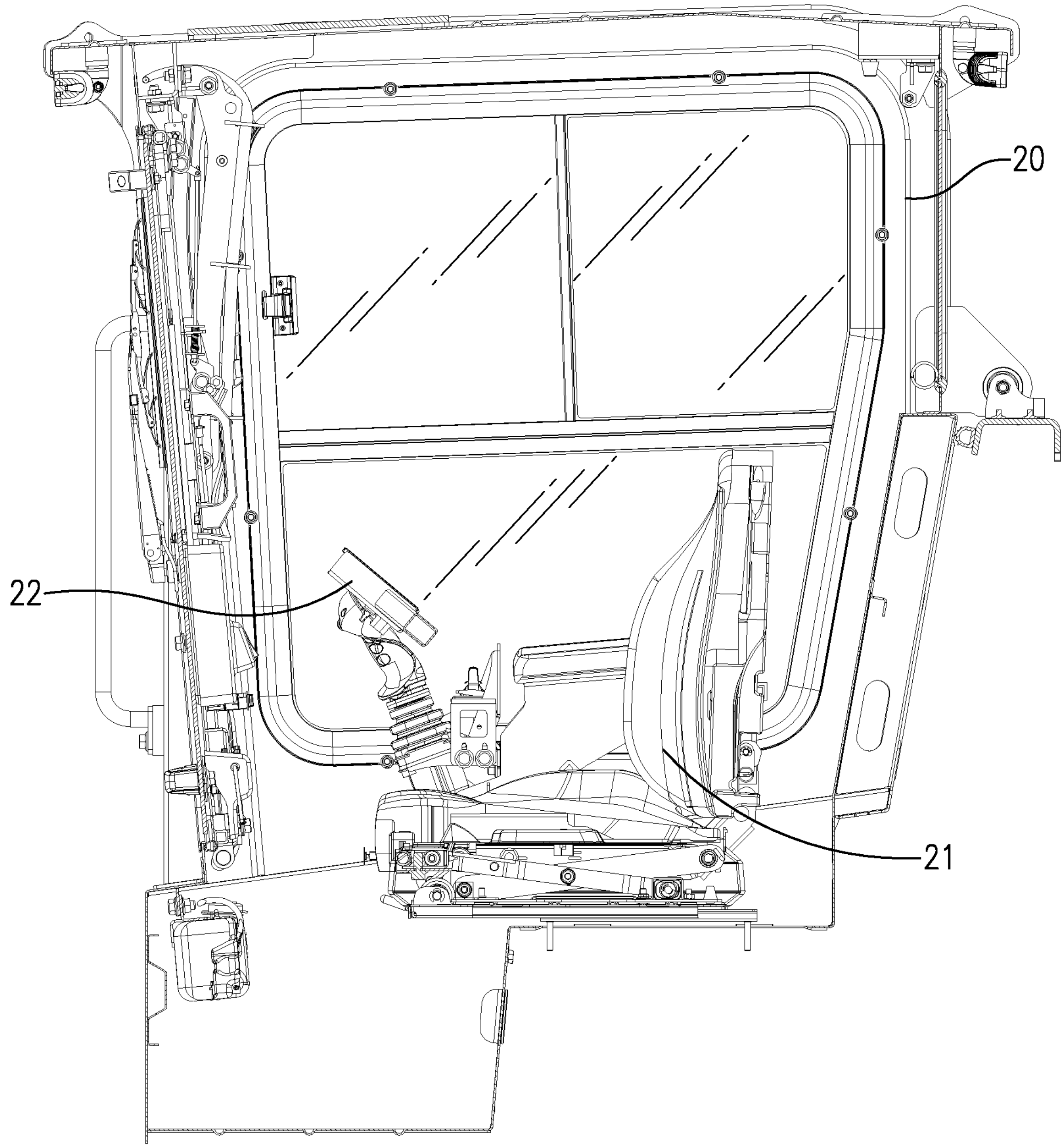
FIG. 9 is a side view of an interior space of a cab of the loader from FIGS. 1-8, with a portion of the cab removed to illustrate user controls of the loader.

Embodiments of the present invention are directed to a work machine, such as a loader 10, as illustrated in exemplary FIGS. 1-8. Broadly, the loader 10 may comprise a frame 12 supported on the ground by a drive assembly 14. As will be discussed in more detail below, in addition to supporting the loader 10 on the ground, the drive assembly 14 is configured to propel the loader 10 over the ground. The loader 10 may additionally comprise one or more (e.g., a pair of) loader arms 16 supported by the frame 12 and configured to be raised and lowered. The loader arms 16 are further configured to support various types of attachments 18 for performing various types of work, as required by an operator of the loader 10. The loader 10 may include an operator cab 20 supported by the frame 12. The cab 20 may, as illustrated by FIG. 9, house a seat 21 and one or more user controls 22 (e.g., buttons, switches, levers, joysticks, touch-screen displays, etc.). The user controls 22 may be used by the operator to control various functions of the loader 10, as will be described in more detail below.

As used herein, directional terms are from the perspective of an operator sitting in the seat 21 of the loader 10 in an operating position (i.e., facing a front end of the loader 10). Thus, the terms "front", "forward", or "fore", mean a longitudinal direction towards the front end of the loader 10. It is noted that the attachment 18 is supported at the front end of the loader 10 by connections with front ends of the loader arms 16. The terms "back," "rear", "rearward", or "aft" mean a longitudinal direction towards the back end of the loader 10, i.e., behind the cab 20. The term "left" or "leftward" means a left lateral direction from the perspective of the operator sitting in the cab 20 and facing forward, and the terms "right" or "rightward" means a right lateral direction from the perspective of the operator sitting in the cab 20 and facing forward.

The loader 10 of embodiments of the present invention may comprise a "compact utility loader" or a "CUL," or may specifically comprise a "compact track loader" or "CTL." As used herein the term "loader" means is a self-propelled work machine comprising one or more loader arms configured to support various interchangeable, attachments that are operably connected with front ends of the loader arms. The attachments may be tools that have hydraulically-driven auxiliary functions, such as augers, grinders, tillers, rollers, trenchers, digger derrick, or the like. However, the loader 10 may support non-hydraulic attachments, such as buckets, blades, or the like. Regardless, because the inventive loader 10 of the present invention may be "compact," i.e., having a smaller size and weight than standard loaders, such compact loader may be much more maneuverable and provide more efficient load/weight distribution than standard loaders.

In more detail, in some embodiments, the loader 10 may have a front-to-back length (excluding the attachment 18) of between 60 and 100 inches, between 70 and 90 inches, or about 85 inches. The loader 10 may have a top-to-bottom height (as measured from a bottom of the drive assembly 14 tracks and a top of the cab 20) of between 50 and 100 inches, between 60 and 90 inches, between 70 and 80 inches, or about 85 inches. The loader 10 may have a lateral width (as measured between the outside lateral edges of the drive assembly 14 tracks) of between 36 and 56 inches, between 40 and 52 inches, or about 48 inches. The frame 12 of the loader 10 may have a lateral width (as measured between the outside lateral edges of the frame 12) of between 32 and 52 inches, between 36 and 48 inches, or about 41 inches. In some embodiments, the loader 10 will be configured with a ground clearance (as measured from the ground surface to a bottom side of the frame 12) of between 7 and 12 inches, between 8 and 10 inches, or about 9 inches. Given such dimensional characteristics, the loader 10 is configured with various enhanced features and functionalities (as described in more detail below), yet maintains an overall small footprint so as to increase maneuverability and to enhance accessibility of the loader to confined working areas/spaces.

Beginning with the frame 12 of the loader 10, the frame 12 may broadly form a housing that defines an interior compartment within which various components of the loader 10 (e.g., engine, hydraulic system, etc.) are housed and supported, as will be discussed in more detail below. The frame 12 may comprise a left side 23 (See FIG. 1) and a right side 24 (See FIG. 2), which are spaced apart and separated by/connected together via a bottom side 26 (See FIG. 2). The left side 23 and the right side 24 may each be configured as a sidewall, and the bottom side 26 may be configured as a bottom wall. As such, the frame 12 can present the interior compartment for supporting various components of the loader 10, as will be discussed in more detail below.

Figure 10:
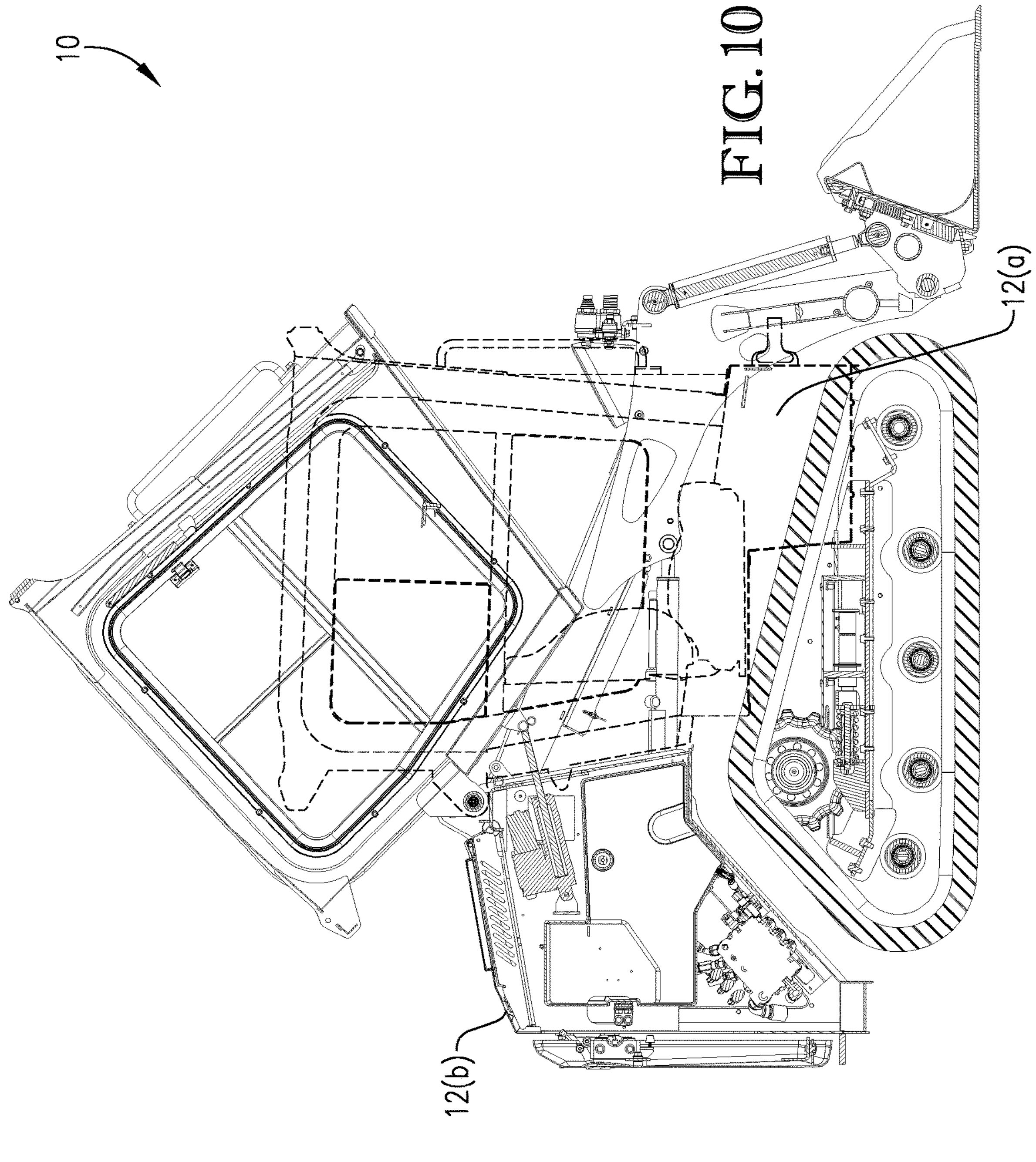
FIG. 10 is a side elevation view of the loader from FIGS. 1-8, with a cab of the loader shown positioned in both a raised position (solid line) and a lowered position (in broken line)
Figure 11:
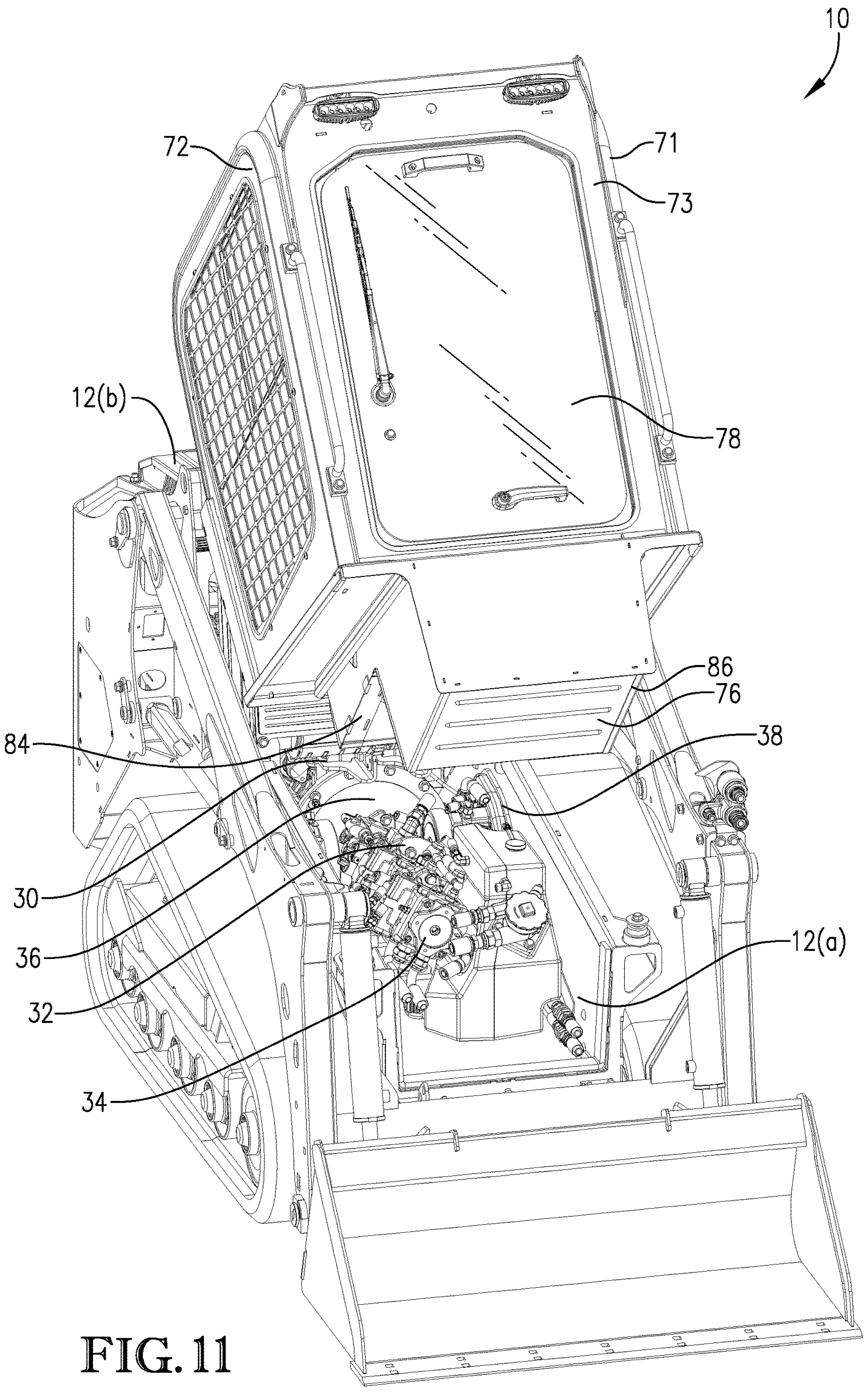
FIG. 11 is a front perspective view of the loader from FIGS. 1-8, with a cab of the loader shown in a raised position.

Furthermore, and with reference to FIGS. 10 and 11, as the frame 12 may comprise a forward portion 12(*a*) and a rearward portion 12(*b*). As such, the frame 12 may extend longitudinally from a rearward end (part of the rearward portion 12(*b*)) to a forward end (part of the forward portion 12(*a*)). In general, the forward portion 12(*a*) of the frame 12 may have a height that is less than height of the rearward portion 12(*b*). In some embodiments, the cab 20 may be hingedly connected to a top of the frame 12, such that the cab 20 can be selectively positioned in a closed, operating position (See, e.g., FIG. 22) and an open, raised position (See, e.g., FIGS. 10 and 11). Specifically, as shown in FIG. 10, a back side of the cab 20 may be hingedly connected to a top of the frame 12, near or at a front of the rearward portion 12(*b*) of the frame 12. The hinge connection may be a lateral extending, horizontal connection, such that the cab 20 can be vertically raised and lowered. When in the closed, operating position, a front, lower portion of the cab 20 may be securely coupled, e.g., via threaded fasteners, latches, or other locking mechanisms, to securely hold the cab 20 in place (with respect to the frame 12) in the closed, operating position. Further, the loader 10 may include an access door 28 hingedly connected to the frame 12 at the back end of the loader 10, and configured to be selectively positioned in a closed position (See, e.g., FIGS. 2 and 6) and an open position (See, e.g., FIG. 12). Specifically, in some embodiments, a right side of the access door 28 may be hingedly connected to a back end of the right side 24 of the frame 20. The hinge connection may be a vertical connection, such that the access door 28 can be opened and closed about a vertical axis. A left side of the access door 28 may include a locking mechanism (e.g., a latch) that permits the access door 28 to be selectively coupled with the left side 23 of the frame 12, so as to maintain the access door 28 in the closed position.

In view of the above, the frame 12, in addition to the cab 20 and the access door 28, are configured to present (and selectively enclose) the interior compartment within which various components of the loader 10. Specifically, with the cab 20 and the access door 28 in the closed position, various components of the loader 10 are enclosed within the interior compartment. Furthermore, however, with the cab 20 and/or the access door 28 in the open position, certain of those various components within the interior compartment may be accessed for maintenance, repair, or the like. For example, and with reference to FIG. 11, the interior compartment of the frame 12 may house a power unit, such as a combustion engine 30 of the loader 10, at least a portion of which may be positioned within a rearward portion 12(*b*) of the frame 12. It is noted that in some embodiments, the loader 10 may include a power unit in the form of an electric motor to power the loader 10, in place of (or in addition to) the combustion engine 30.

The interior compartment may additionally house one or more components of a hydraulic system that is used to power one or more hydraulically-powered components of the loader 10. The hydraulic system may comprise a hydraulic auxiliary pump 32 that may be operably connected to a front end of the engine 30, as well as a hydrostatic transmission 34 that may be operably connected to a front end of the auxiliary pump 32. As such, the engine 30 may provide rotary power to each of the auxiliary pump 32 and the hydrostatic transmission 34. As will be described in more detail below, the hydraulic system, and particularly the hydraulic pump 32, may provide hydraulic power to the loader arms 16 and to the attachments 18 of the loader 10, as necessary. The hydraulic system, and particularly the hydrostatic transmission 34, may provide hydraulic power to the drive assembly 14, as discussed in more detail below. In some embodiments, a flywheel 36 may be positioned between the engine 30 and the auxiliary pump 32 and the hydrostatic transmission 34. Such flywheel 36 may be used to maintain a consistent power output from the engine 30 during varying RPMs.

In certain embodiments, the loader 10 may include a pair of drive motors 38 positioned within the interior compartment of the frame 12, on either side of the auxiliary pump 32 (i.e., a left side drive motor 38 and a right side drive motor 38). Such drive motors 38 may be used to provide power to the drive assembly 14. Specifically, the hydrostatic transmission 34 may be configured to provide hydraulic power to the drive motors 38, which in turn provide rotary power to the drive assembly 14 (e.g., tracks or wheels) of the loader 10. In some embodiments, the loader 10 may be in the form of a compact track loader, such that the drive assembly 14 comprises a pair of tracks, as described in more detail below. However, the loader 10 may, alternatively, be propelled by one or more wheels in place of, or in addition to, tracks. Regardless, as discussed above, the interior compartment of the frame 12, may house the engine 30, the auxiliary pump 32, the hydrostatic transmission 34, the flywheel 36, and the drive motors 38, as well as various other components of the loader's 10 hydraulic system (e.g., one or more hydraulic fluid reservoir tank(s) (e.g., a plurality of hydraulic fluid reservoir tanks), filters, ride control valve, accumulator, brake valve, lines/conduits, etc.). In some embodiments, the engine 30 may be positioned within the rearward portion 12(*b*) of the frame 12, while the auxiliary pump 32, the hydrostatic transmission 34, the flywheel 36, and the drive motors 38, as well as various other components of the loader's 10 hydraulic system may be positioned within the forward portion 12(*a*) of the frame 12. Regardless, as described in more detail below, certain components of the loader's 10 hydraulic system may be positioned within the rearward portion 12(*b*) of the frame 12.

Figure 12:
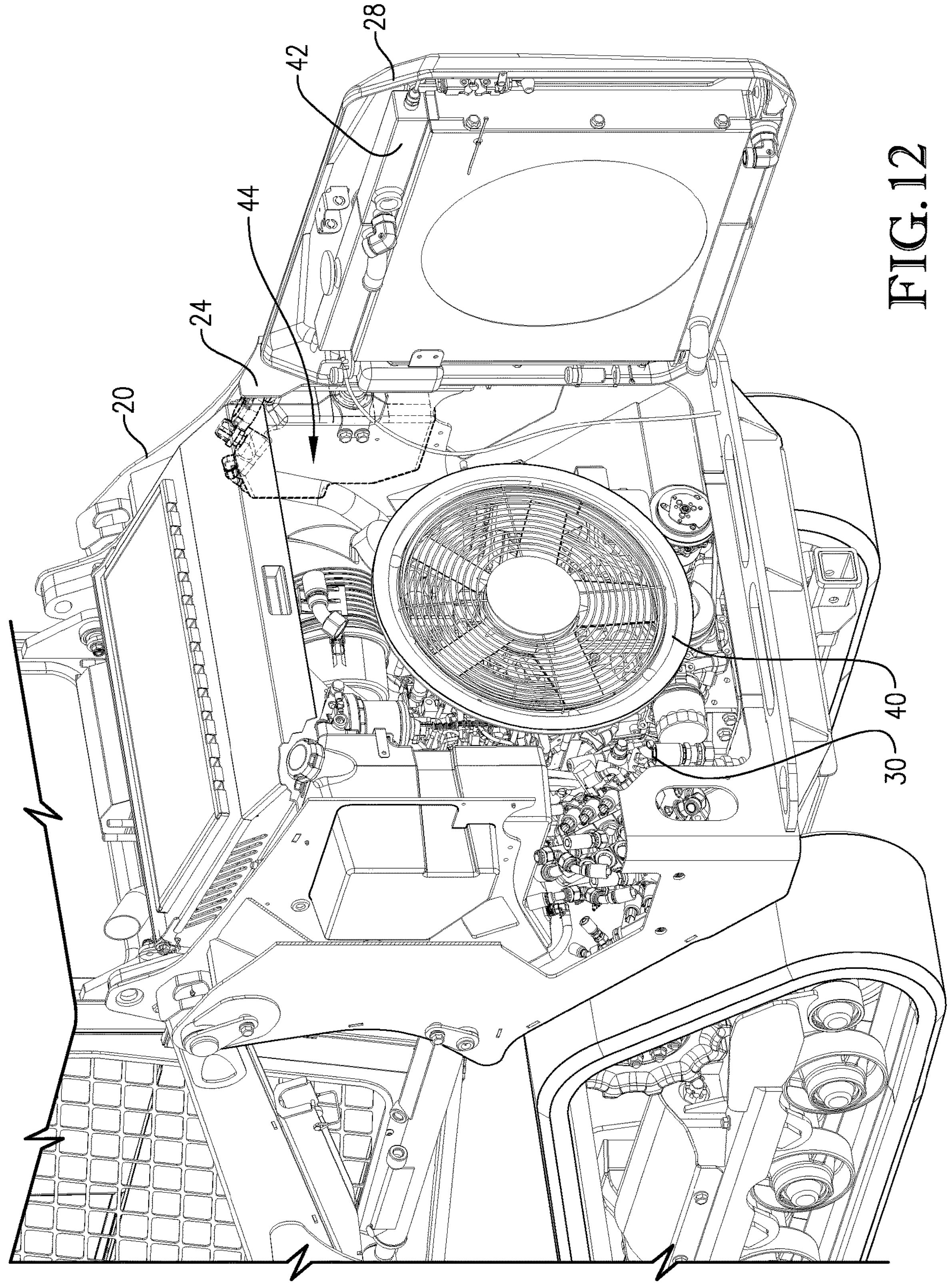
FIG. 12 is a rear perspective view of the loader from FIGS. 1-8, with a rear access door of the loader illustrated in an open position.
Figure 13:
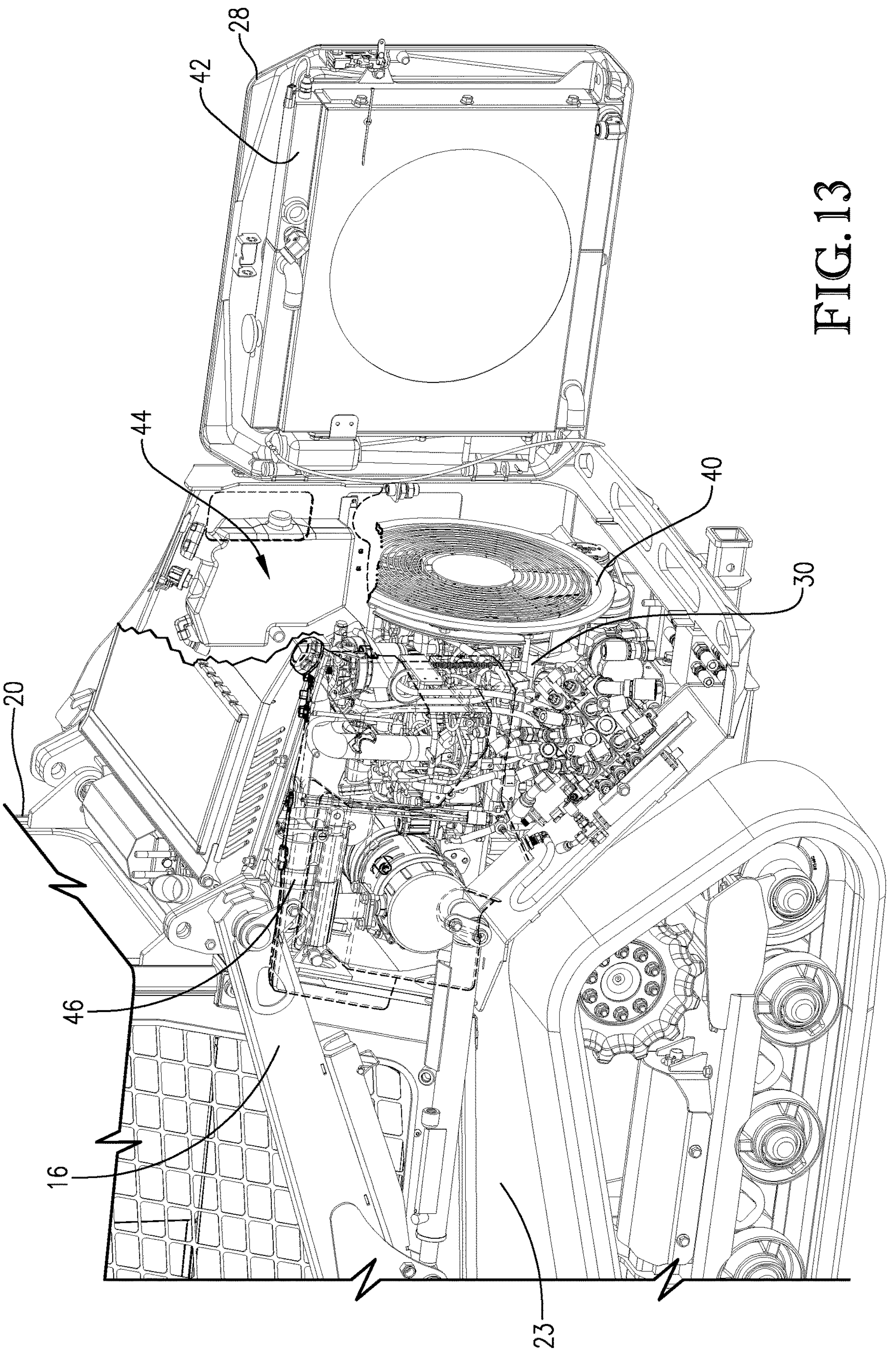
FIG. 13 is another rear perspective view of the loader from FIGS. 1-8, with a portion of a frame of the loader cut away to illustrate internal components of the loader.

Turning to the rearward portion 12(*b*) of the frame 12 in more detail, as illustrated in FIGS. 12 and 13, various components of the loader 10 may be positioned within the internal compartment presented by the rearward portion 12(*b*). For instance, as noted previously, the engine 30 (or at least a portion thereof) may be positioned within the rearward portion 12(*b*) of the frame 12. A cooling system may be positioned rearward of the engine 30. In particular, the cooling system may comprise a fan 40 attached to a rear side of the engine 30. The cooling system may additionally comprise a radiator 42 positioned rearward of the fan 40. In some embodiments, as will be described in more detail below, the radiator 42 may be attached to the access door 28 and configured to rotate open and closed (with respect to the fan 40) in conjunction with the access door 28. In addition, the rearward portion 12(*b*) of the frame 12 may house a heating, ventilation, and air-conditioning ("HVAC") system 44, which is configured to provide temperature controlled airflow to the cab 20, as will be discussed in more detail below. Furthermore, the rearward portion 12(*b*) of the frame 12 may house an actuator 46, as shown in FIG. 13, in operable engagement with the cab 20 and configured to selectively shift the cab 20 between open and closed positions, as noted above and as will be discussed in more detail below. The actuator may comprise an electro-hydraulic actuator, as well as various other types linear actuators. Finally, the rearward portion 12(*b*) of the frame 12 may house various other components of the loader, such as components of the loader's 10 electrical system (e.g., battery, engine 30 starter, alternator), fuel tank, associated cables/lines, etc.

Notably, the cab 20 and the access door 28 being configured to selectively open and close provide access to the interior compartment of the frame 12. For example, the cab 20 can be raised to the open position to provide access to the engine 30, the auxiliary pump 32, the hydrostatic transmission 34, the flywheel 36, the drive motors and/or various other components of the loader's 10 hydraulic system. The access door 28 can be opened to provide access to the engine 30, the cooling system (e.g., the fan 40 and radiator 42), the HVAC system 44, electrical system, and/or other related components. Such access can facilitate efficient service and maintenance of the loader 10.

Figure 4:
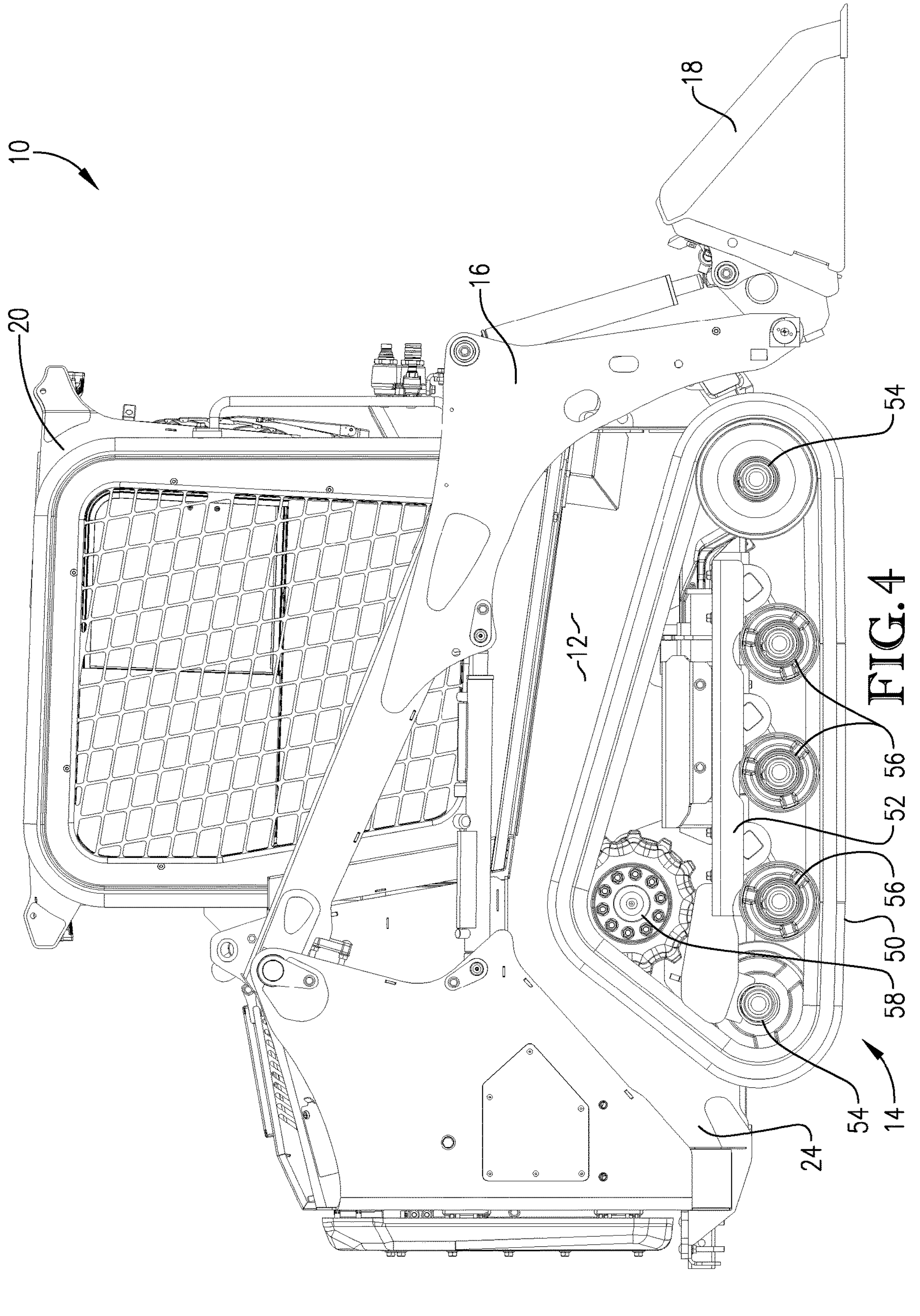
FIG. 4 (REPLACE With new FIG. that shows fill sight) is a right side elevation view of the loader from FIGS. 1-3
Figure 5:
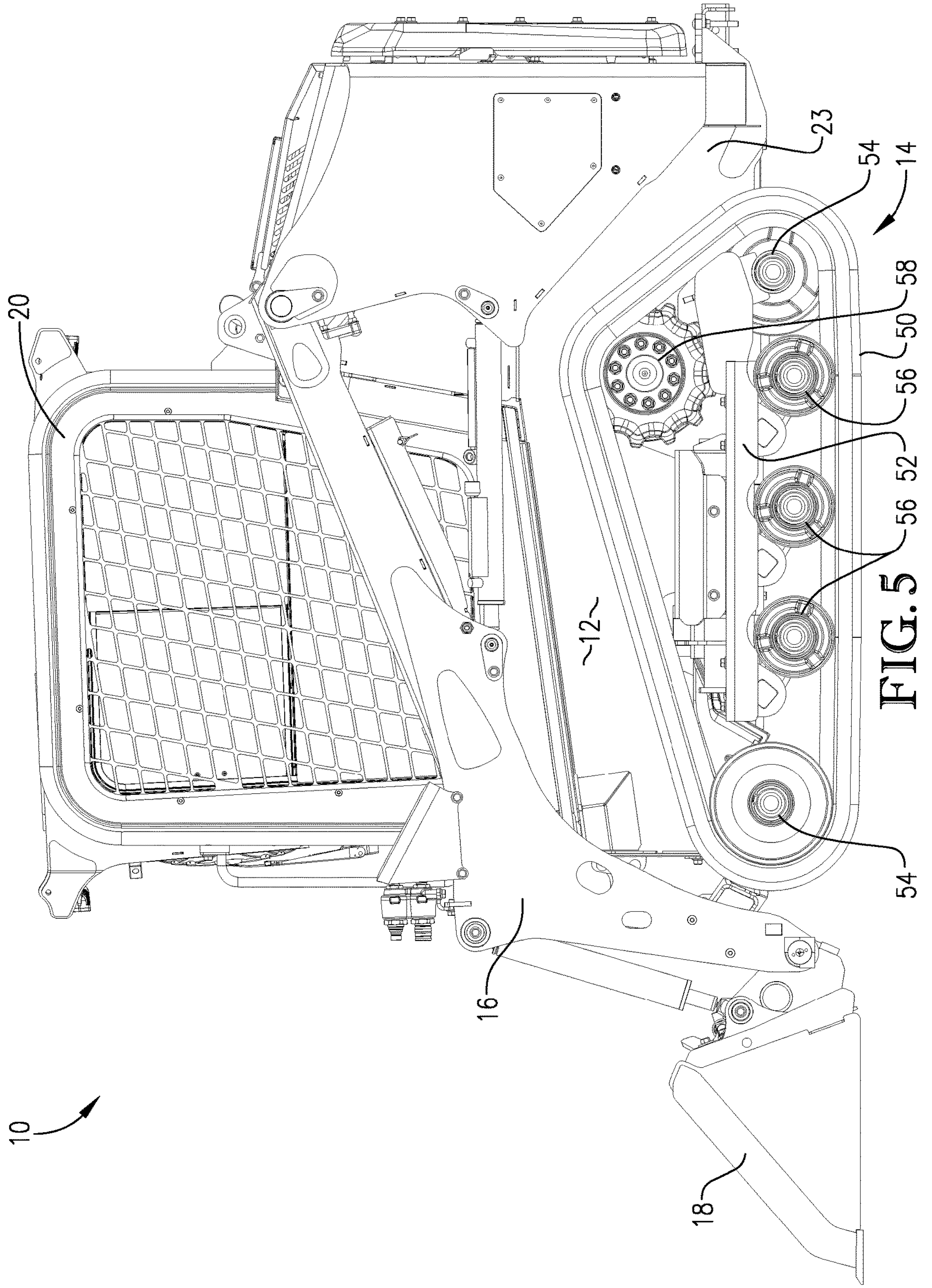
FIG. 5 is a left side elevation view of the loader from FIGS. 1-4
Figure 6:
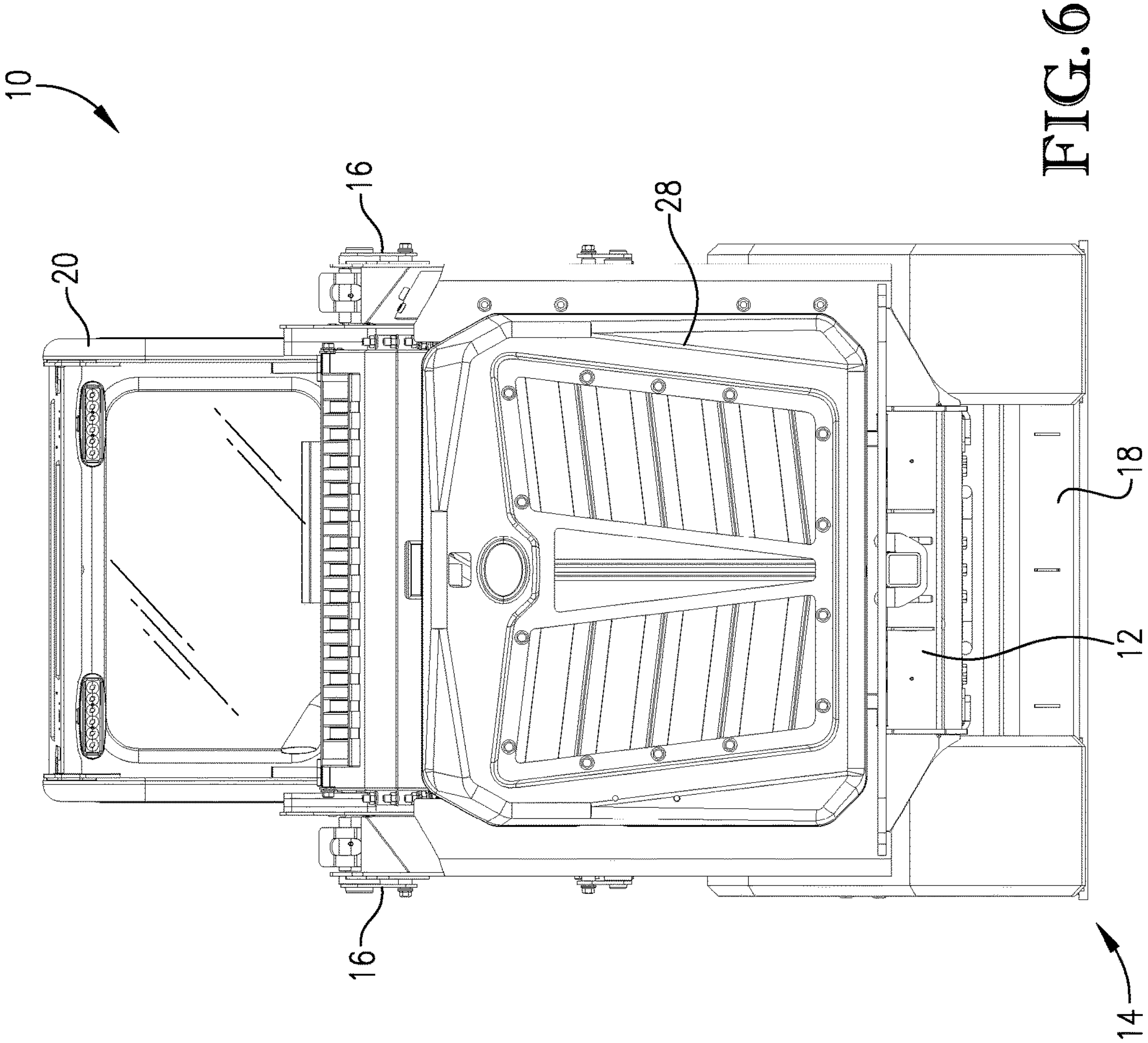
FIG. 6 is a rear elevation view of the loader from FIGS. 1-5.
Figure 7:
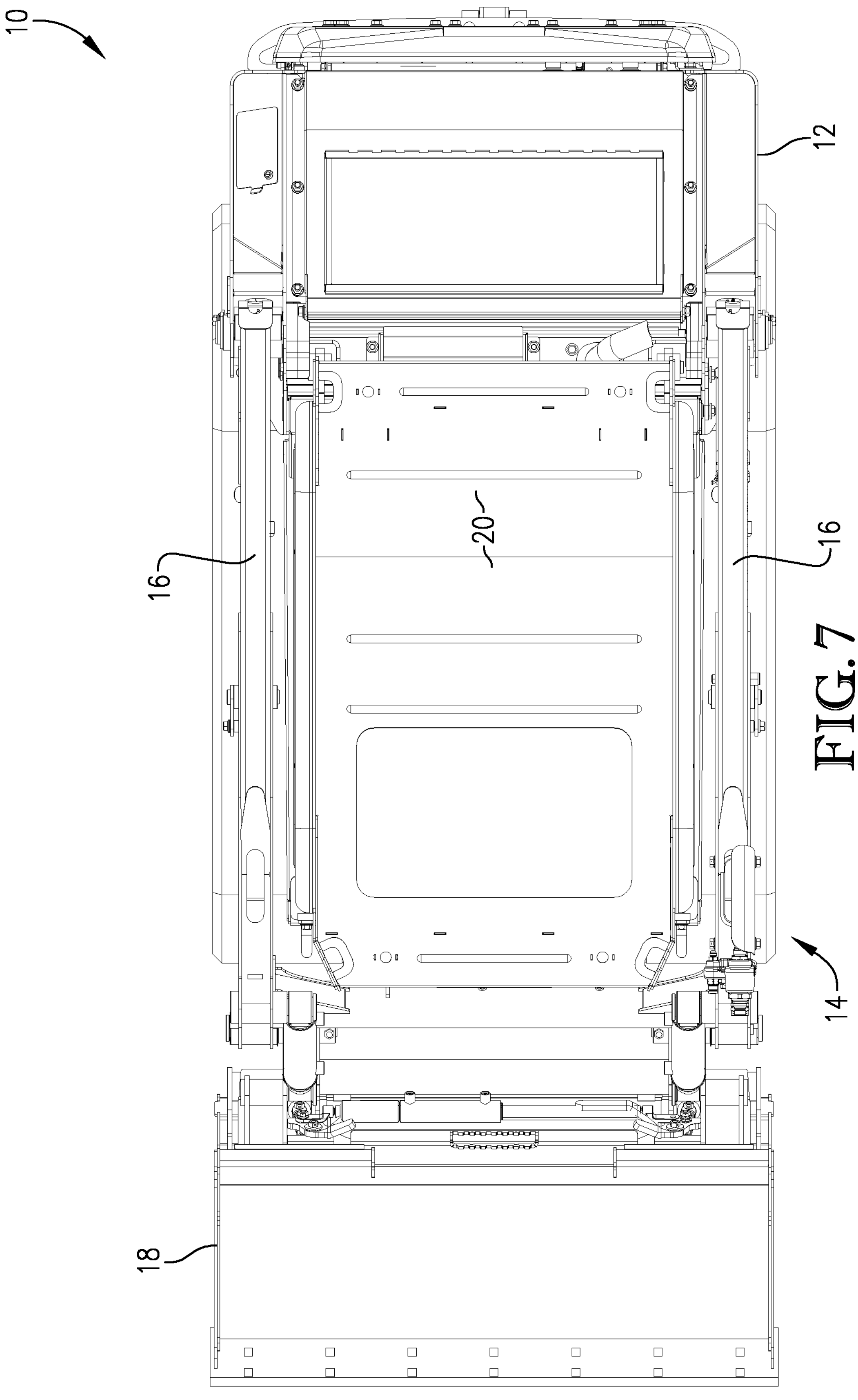
FIG. 7 is a top plan view of the loader from FIGS. 1-6.
Figure 8:
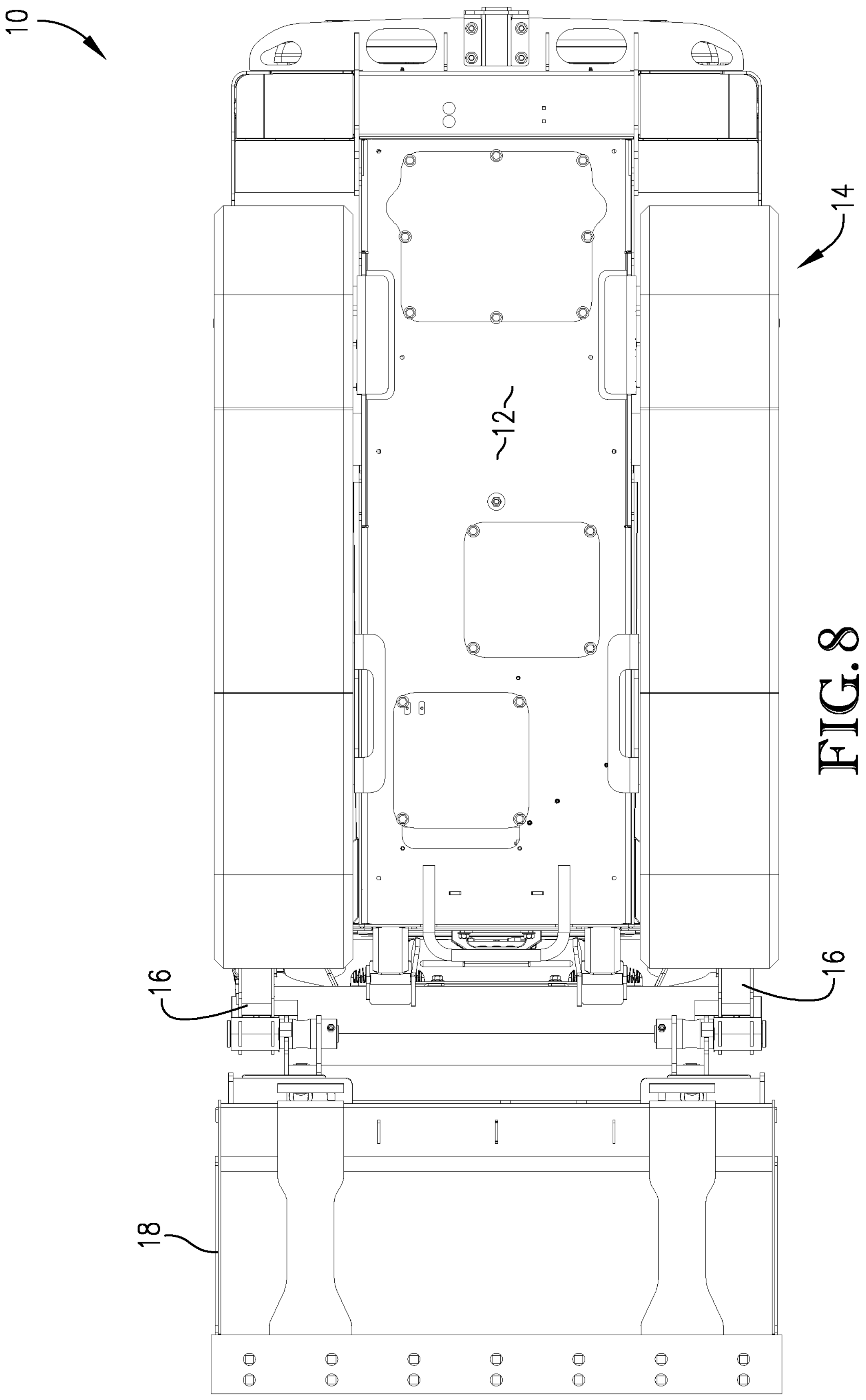
FIG. 8 is a bottom plan view of the loader from FIGS. 1-7.

With reference to FIGS. 4 and 5, the drive assembly 14 of the loader may comprise a pair of endless tracks 50 that extend from the exteriors of the left side 23 and the right side 24 of the frame 12. In more detail, the drive assembly 14 may comprise a pair of track frames 52, with each track frame 52 being rigidly secured to one exterior side 23, 24 of the frame 12 of the loader 10. Specifically, the left side track frame 52 may be rigidly secured (e.g., via welding) to the left side 23 of the frame 12, so as to extend laterally away from the frame 12. Similarly, the right side track frame 52 may be rigidly secured (e.g., via welding) to the right side 24 of the frame 12, so as to extend laterally away from the frame 12. As shown in FIGS. 4 and 5, the track frames 52 may support one or more wheels rotatably secured thereto, so as to permit the tracks 50 to rotate around the track frames 52. Specifically, each track frame 52 may support a pair of idler wheels 54, with a front idler wheel 54 secured to a front of the track frame 52 and a rear idler wheel 54 secured to a rear of the track frame 52. In addition, each track frame 52 may support a plurality of roller wheels 56 (e.g., three roller wheels) secured to the track frame 52 between the idler wheels 54 in a front-to-back direction. Each of the roller wheels 56 be secured to a bottom of the track frame 52 via an independent suspension element so as to provide enhanced stability and driveability of the loader 10. In contrast, the idler wheels 54 may be directly secured to the track frames 52 via an axle.

One of the tracks 50 may loop around each of the track frames 52 and associated wheels (e.g., idler wheels 54 and roller wheels 56) so as to present a left track 50 and a right track 50. The tracks 50 may be formed from rubber, metal, or combinations thereof. Although the loader 10 is illustrated as having tracks 50, in some embodiments, the loader 10 may include one or more wheels on each side 23, 24 of the frame 12 to support and to propel the loader 10.

To facilitate rotation of the tracks 50, the drive assembly 14 may additionally comprise a pair of drive sprockets 58 positioned on either exterior side 23, 24 of the frame 12, as shown in FIGS. 4 and 5. Specifically, in some embodiments, a left side drive sprocket 58 may extend from the left side 23 of the frame 12 at a position above the left side track frame 52. Similarly, a right side drive sprocket 58 may extend from the right side 24 of the frame 12 at a position above the right side track frame 52. Each of the tracks 50 may be looped around the associated track frame 52, wheels (e.g., idler wheels 54 and roller wheels 56), and drive sprocket 58. As such, the tracks 50 may be configured in a triangular shape, when viewed from the sides of the loader 10. An interior surface of the tracks 50 may be formed with nubs that engage with teeth of the drive sprockets 58, such that rotation of the drive sprockets 58 will cause a corresponding rotation of the tracks 50. As such, the loader 10 can be propelled by rotating the drive sprockets 58, which causes rotation of the tracks 50. Specifically, the left side drive sprocket 58 may be operably connected with the left side drive motor 38, and the right side drive sprocket 58 may be operably connected with the right side drive motor 38, such that the drive motors 38 can drive the drive sprockets 58. As a result, the loader 10 can be propelled forward, rearward, and turn leftward/rightward.

Turning to the loader arms 16 of the loader 10, the loader arms 16 may comprise two loader arms 16 in the form of a left loader arm (i.e., positioned on a left side of the loader 10) and a right loader arm (i.e., positioned on a right side of the loader 10). Each of the loader arms 16 may have a rear end that is pivotably coupled with the frame 12 of the loader 10, near the back end of the loader 10. Each of the loader arms 16 may extend forward to a front end that supports a hitch assembly 60, as perhaps best shown in FIG. 2. Such hitch assembly 60 may extend at least partially between the left and right loader arms and may generally comprise one or more connection plates configurable to releasably secure various types of attachments 18 to the loader arms 16. The loader arms 16 may additionally include a cross-bar, as perhaps best shown in FIG. 1, that extends between the left and right loader arms 16. In certain embodiments, the cross-bar may be positioned adjacent to and behind the hitch assembly 60. Furthermore, in some embodiments, each of the loader arms 16 may include a tilt actuator 62, as shown in FIG. 1, that extends from the loader arm 16 to one of the lateral sides of the hitch assembly 60, so as to permit tilting of the hitch assembly 60 and any attachment 18 coupled with the hitch assembly 60. The tilt actuators 62 may comprise hydraulic cylinders (e.g., single or double-acting cylinders), pneumatic cylinders, and/or electric linear actuators. For example, if an attachment 18 in the form of a bucket is attached to the hitch assembly 60, actuation of the tilt actuators 62 will permit the bucket to be tilted such as for selectively collecting and dumping material. Finally, one or more of the loader arms 16 may include a hydraulic coupler 64, as shown in FIG. 1, with which one or more hydraulic lines may be coupled to provide hydraulic power to attachments 18 that operate on hydraulic power.

The loader arms 16 may be raised and lowered via lift actuators 66. In some embodiments, the lift actuators 66 may comprise linear actuators, such as hydraulic cylinders (e.g., single or double-acting cylinders), pneumatic cylinders, and/or or electric linear actuators. In more detail, each loader arm 16 may be associated with a lift actuator 66 that is pivotably coupled at a rearward end with one lateral side the frame 12. Each lift actuator 66 extends generally forward to a respective loader arm 16, such that a forward end of the lift actuator 66 is pivotably coupled with the loader arm 16 at a position between the rearward and forward end of the loader arm 16. In some embodiments, the frame 12 may include a cover panel 68 one each lateral side of the loader 10 that is spaced apart from the left side 23 and right side 24 of the frame 12. In certain embodiments, the cover panels 68 may cover rearward portions of the loader arms 16 and the lift actuators 66, so as to cover the connections between the loader arms 16 and the lift actuators 66 to the frame 12. In some embodiments, connection between the loader arms 16 and the lift actuators 66 to the frame 12 may also include a connection with the cover panels 68. Specifically, the rearward ends of the loader arms 16 and the lift actuators 66 may be positioned between the respective left or right sides 23, 24 of the frame 12 and the respective cover panels 68 of the frame, such that the rearward ends of the loader arms 16 and the lift actuators 66 are simultaneously rotatably coupled with both the left or right sides 23, 24 and the respective cover panels 68.

Because the rear ends of the loader arms 16 are rotatably coupled with the frame 12 at a fixed pivot point, the loader arms are configured in a "pivot-lift configuration" (also commonly referred to as a "radial lift configuration). In such a configuration, the forward ends of the loader arms 16, and any attachment 18 coupled therewith, will generally travel in an arc-like or circular travel path. In some other embodiments (not shown in the drawings), the loader arms 16 may be configured in a "vertical-lift configuration." In such a configuration, the entirety of the loader arms 16 shift position upward, downward, forward, and/or rearward with respect to the frame 12 of the loader 10 as the loader arms 16 transition between lowered and raised positions. As such, the forward ends of vertical-lift configured loader arms 16, and any attachment 18 coupled therewith, can travel along a substantially vertical travel path.

Figure 2:
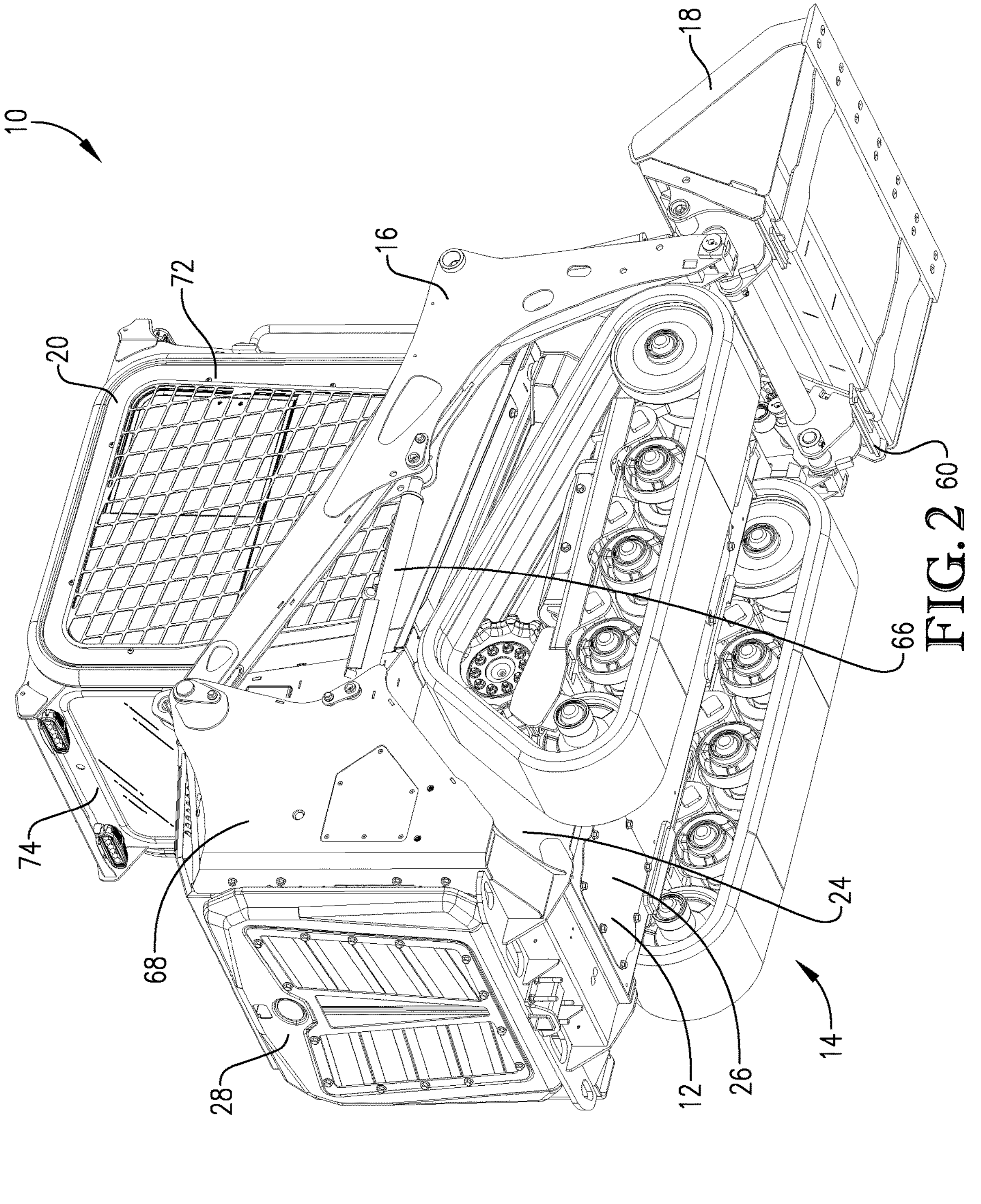
FIG. 2 is a rear perspective view of the loader from FIG. 1.
Figure 3:
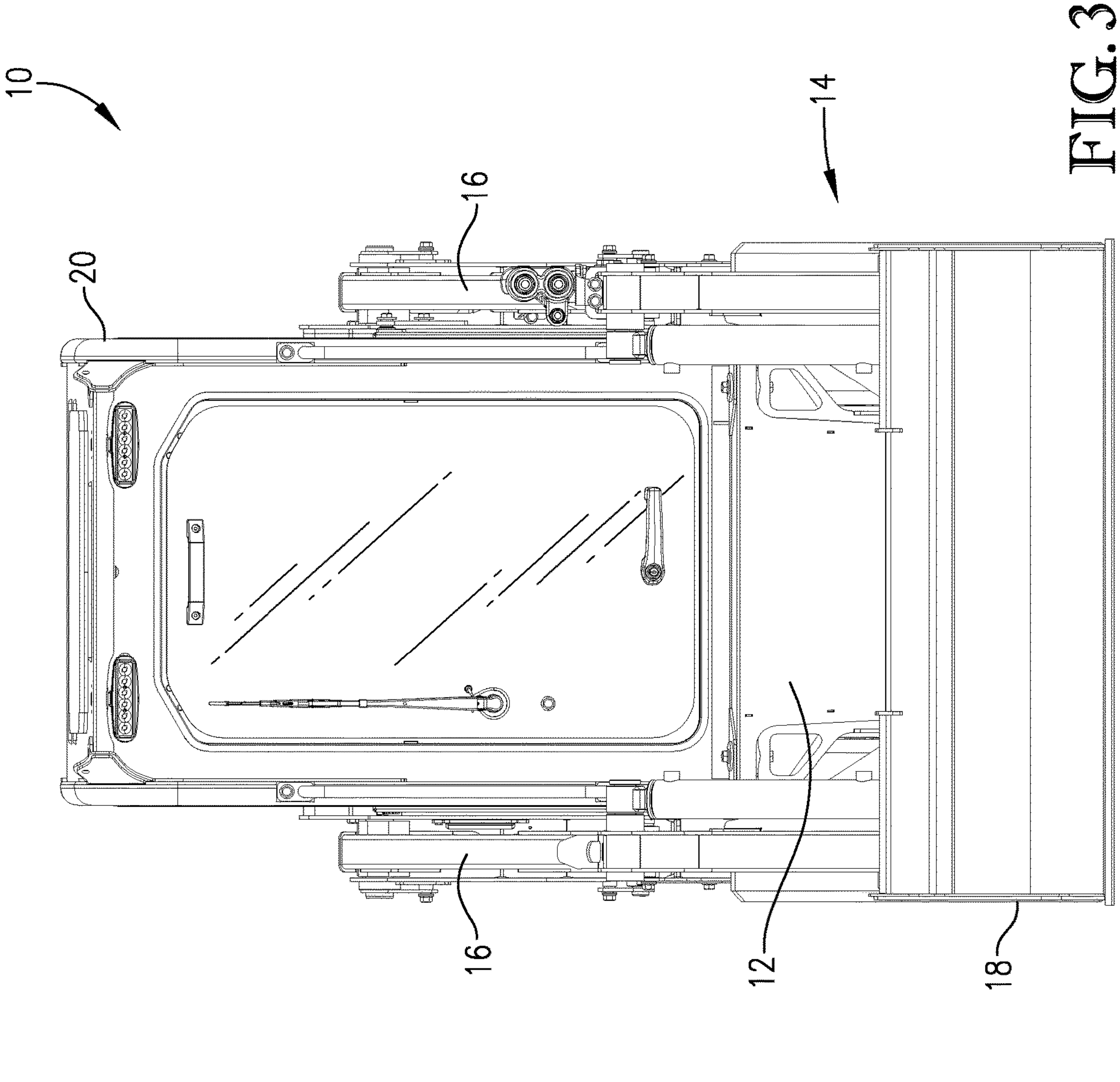
FIG. 3 is a front elevation view of the loader from FIGS. 1 and 2.

As noted previously, the cab 20 of the loader 10 may be rotatably coupled with the frame 12, as illustrated in FIG. 10, such that the cab 20 can be selectively positioned in a closed, operating position and in an open, raised position. The cab 20 may, as shown in FIGS. 1, 2, and/or 11, have a generally rectangular shape with a left side 71, a right side 72, a front side 73, a back side 74, a top side 75, and a bottom side 76. The sides 71-76 of the cab 20 may enclose an interior space within which an operator can be positioned to operate the loader, as will be disclosed in more detail below. Each of the left side 71, the right side 72, and the back side 74 may comprise a frame bordering a transparent material (e.g., plastic or glass) configured to operate as a window, such that an operator of the loader 10 can view the eternal environment. In certain embodiments, the back side 74 may comprise a lower portion and an upper portion. The upper portion may comprise the transparent material, while the lower portion may comprise a generally solid, sheet of material (e.g., steel). However, the lower portion may include one or more openings or ports configured to facilitate airflow into and out of the cab 20 from the HVAC system 44. In some embodiments, the top side 75 may also include one or more windows so as to permit light to enter the interior space of the cab 20.

Figure 14A:
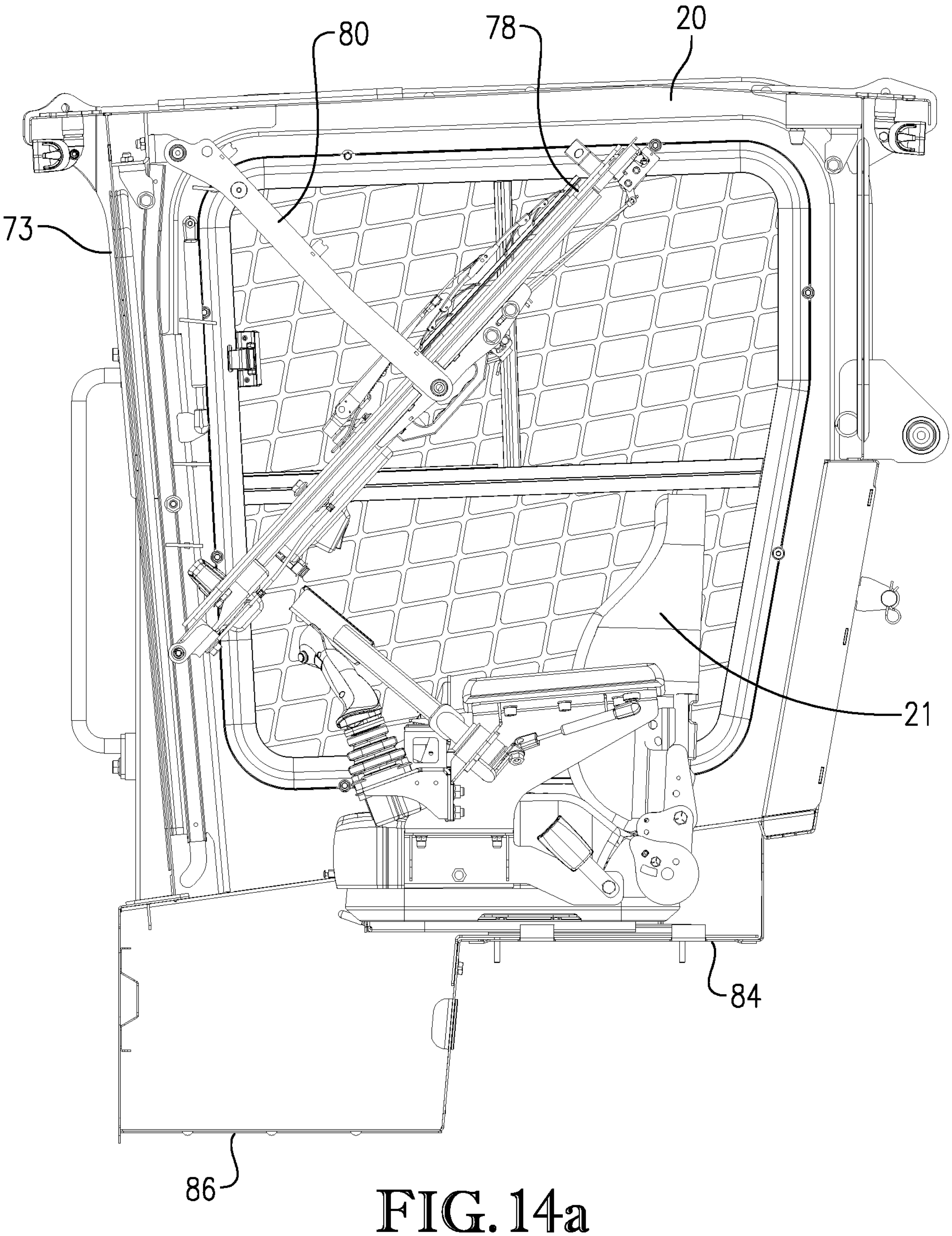
FIG. 14*a* is a left side elevation view of an interior space of a cab of the loader from FIGS. 1-8, with a portion of the cab removed to illustrate a main door in an intermediate position between a closed position and an opened position.
Figure 14B:
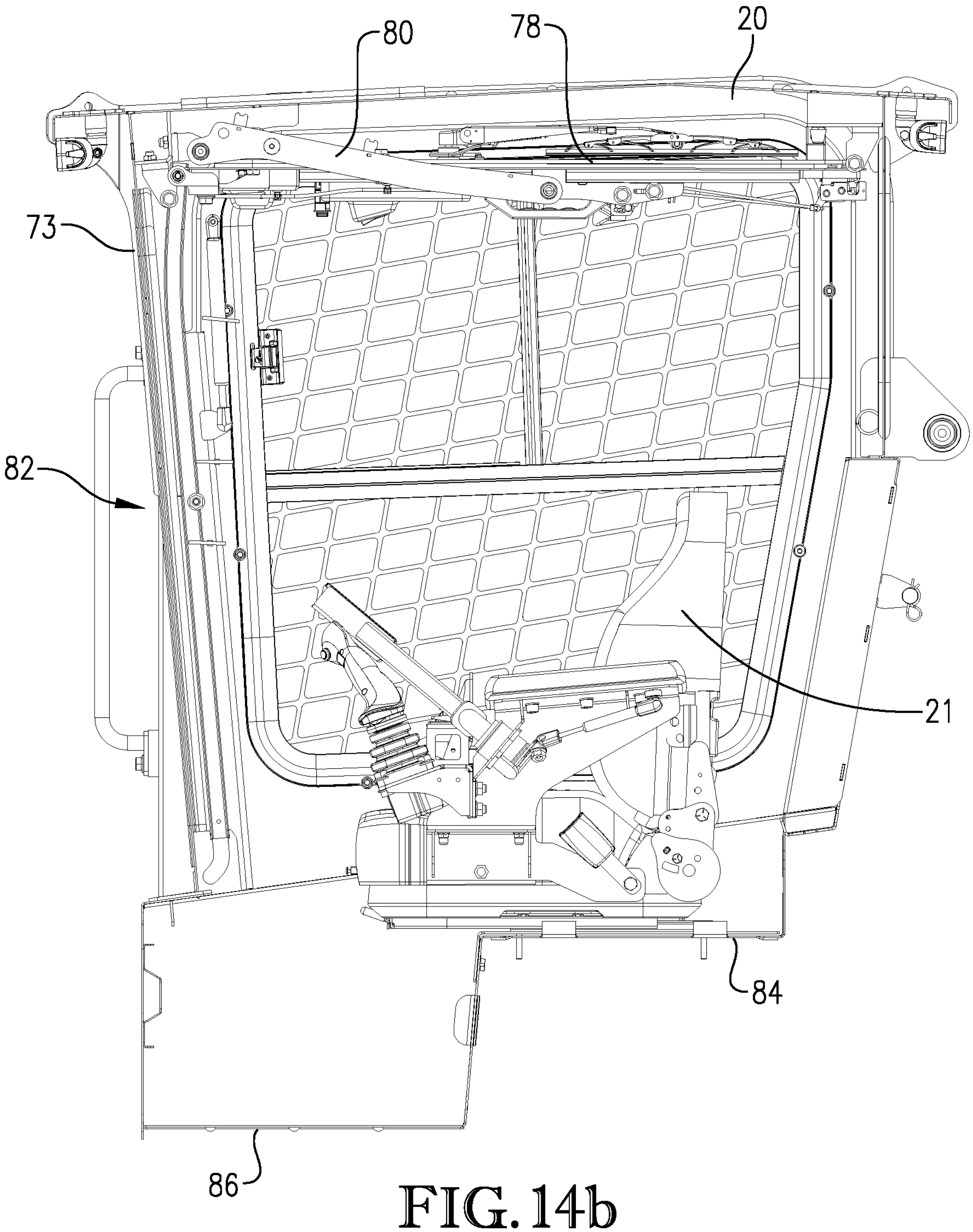
FIG. 14*b* is a left side elevation view of the interior space of the cab from FIG. 14*b*, with the main door the opened position.

The front side 73 of the cab 20 may comprise a frame that borders a main door 78. As shown in FIGS. 14*a* and 14*b*, the main door 78 may be attached to other components of the cab 20 via an actuation assembly 80 configured to permit the main door 78 to selectively transition back and forth between an opened position (e.g., FIG. 14*b*) and a closed position (e.g., FIG. 1). It is noted that FIG. 14*a* illustrates the main door in a transition state between the opened position and the closed position. The main door 78 may comprise a transparent material (e.g., plastic or glass) configured to operate as a window. With the main door 78 in a closed position (i.e., positioned generally parallel with and adjacent to the frame of the front side 73 as shown in FIG. 1), the door 78 acts as a window, such that the operator can view forward so as to observe the environment, the loader arms 16, the attachment 18, etc. of the loader 10. When the main door 78 in an open position, as shown in FIG. 14*b* (i.e., positioned generally parallel with and adjacent to the top side 75), the main door 78 is actuated away from the front side 73 of the cab so as to present an open entryway 82 through which an operator can enter and exit the interior space of the cab 20.

With reference to FIG. 11, the bottom side 76 of the cab 20 may comprise a main platform 84 on which the seat 21 is positioned within the interior space of the cab 20. The bottom side 76 may additionally comprise a lowered platform 86 positioned forward of the main platform 84, and is configured to receive the feet of the operator of the loader 10 when the operator is seated on the seat 21 to operate the loader 10.

Figure 15A:
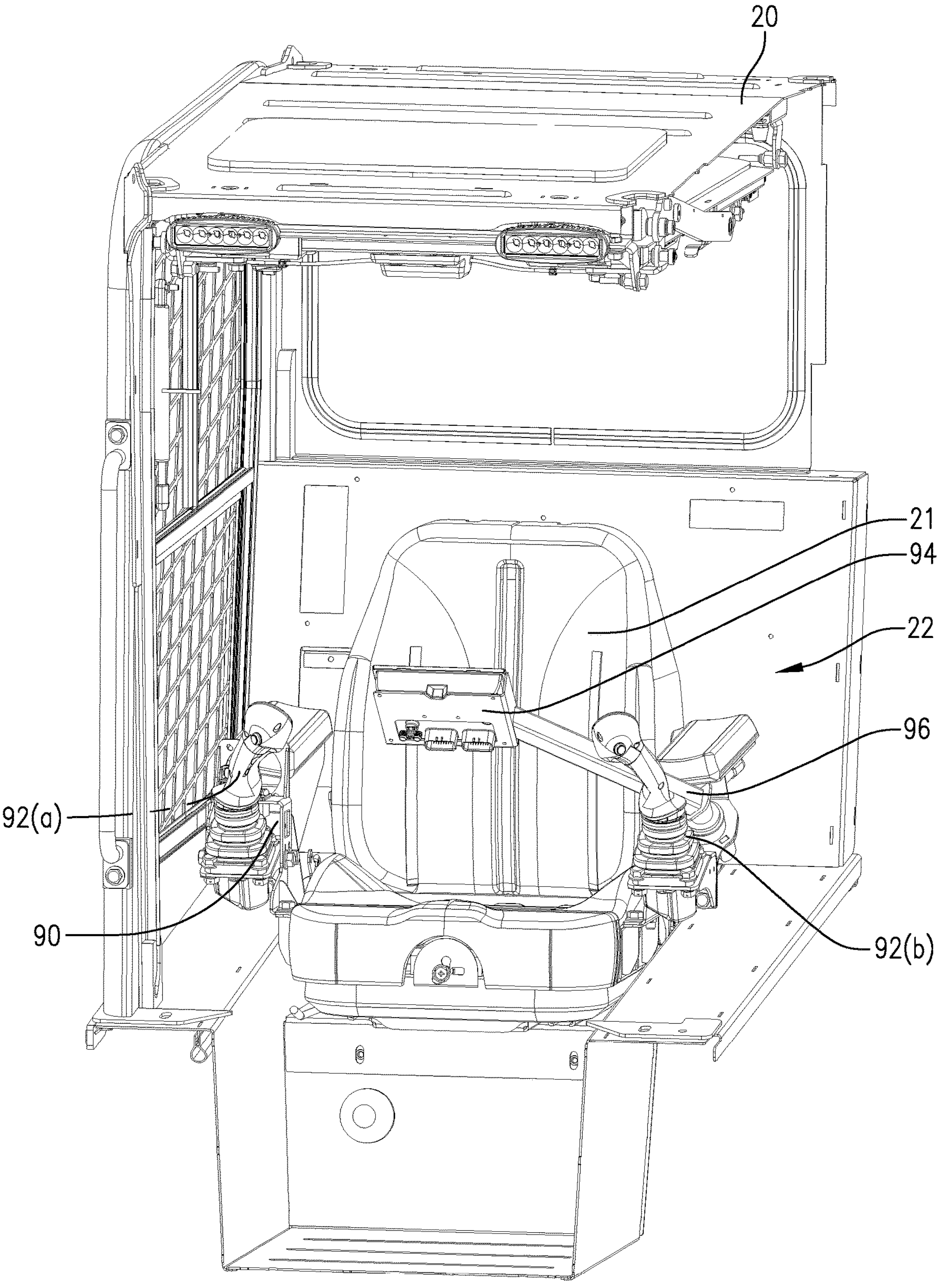
FIG. 15*a* is a front perspective view of a cab of the loader from FIGS. 1-8, with a portion of the cab cut away to illustrate user controls of the loader, and with a graphic display and lap bar in a lowered, operating position.
Figure 15B:
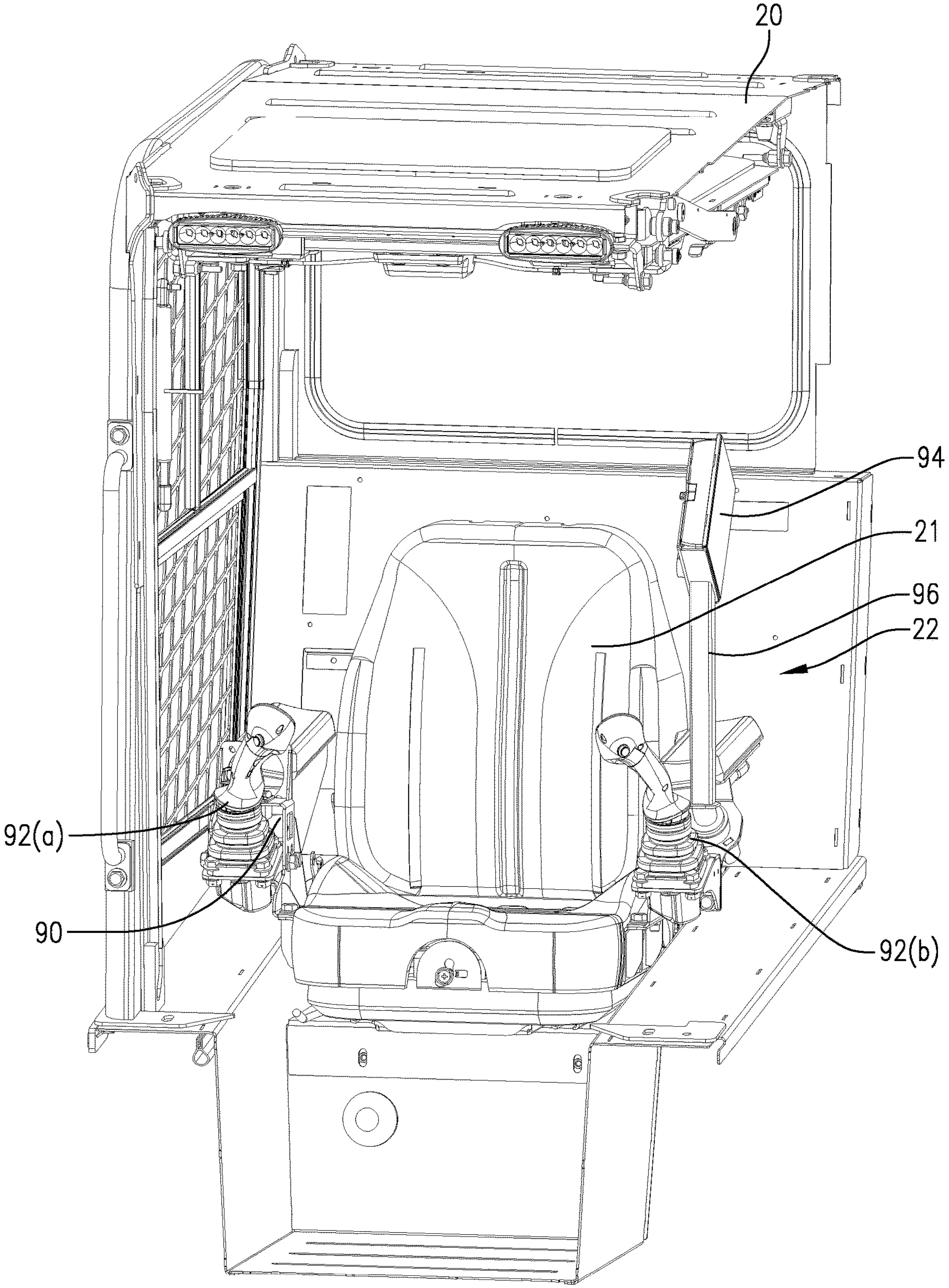
FIG. 15*b* is a front perspective view of the cab from FIG. 15*a*, with the graphic display and lap bar in a raised, non-operating position.

Turning to FIGS. 15*a* and 15*b*, the interior space of the cab 20 includes a plurality of user controls 22 (e.g., buttons, switches, levers, joysticks, touchscreen displays, etc.) that the operator can access and manipulate when the operator is seated on the seat 21. As such, the interior space of the cab 20 may be referred to as a control station. In more detail, the seat 21 may include a pair of armrests on which a user may rest his/her arms when seated in the seat 21 and operating the loader 10. A control panel 90 with one or more user controls 22, in the form of buttons, switches, or levers, may be positioned forward of one of the armrests. The operator may select such user controls 22 on the control panel 90 to perform various functions of the loader, such as (i) providing electrical power from the battery to various components of the loader, (ii) turning on/off vehicle lights of the loader, which may be positioned on exterior portions of the cab 20, (iii) starting the engine 30 of the loader 10.

In addition, a pair of joysticks 92 may be positioned forward of the armrests such that an operator can comfortably reach the joysticks 92 when seated in the seat 21. A first of the joysticks 92 may be a loader arm & attachment ("LA&A") joystick 92(*a*) for controlling actuation of the loader arms 16 (e.g., raising and lowering) and various hydraulically-operated functions of the attachment 18 that may be supported on the front of the loader arms 16. For example, the hydraulically-operated functions may include a tilt function for buckets or auxiliary hydraulic functions for other hydraulically-operated attachments 18 such as, e.g., bit rotation of a drill, bit actuation of a jack-hammer, rotation of a blade for a saw, rotation of multiple blades for a rotary cutter, brush rotation of a sweeper, etc. In addition, a second of the joysticks 92 may include a drive joystick 92(*b*), which is configured to control actuation of the tracks 50 (e.g., via control the drive motors 38 and the sprockets 58) for controlling overall movement (e.g., travel direction and speed) of the loader 10. In more detail, the drive joystick 92(*b*) may extend upward in front of the armrests, such that an operator may grasp and shift the drive joystick 92(*b*) so as to cause a corresponding movement of the loader 10. In certain embodiments, the loader 10 may include an electric-over-hydraulic ("EOH") system, such that the joysticks 92 may generate electric signals, which are configured to control hydraulic components of the loader 10.

In addition, the user controls 22 may include a graphic display 94 comprising an electronic display, such as a cathode ray tube, liquid crystal display, plasma, or touch screen that is operable to display visual graphics, images, text, etc. In embodiments in which the graphic display 94 is a touchscreen, the operator can manipulate the graphic display 94 to control various aspects and/or functionalities of the loader 10. The graphic display 94 may include, or may otherwise be associated with, one or more memory elements and processing elements. The memory elements may comprise non-transitory computer readable media and/or firmware, with a computer program stored thereon. The processing elements may comprise processors, CPUs, FPGAs, etc., which are configured to execute computer programs stored on the memory elements to perform various functions and features of the loader 10. It should be understood that certain of the loader's 10 functions and features discussed above and below may be performed by execution of the computer program by the processing elements. For example, the graphic display 94 may be configured to (by the processing elements executing the computer program stored on the memory elements) (i) obtain information from various components of the loader 10 (e.g., via sensors, actuators, timers, clocks, etc.) so as to present such information to the operator via the graphic display 94, and (ii) receive instructions from the operator (e.g., via the graphic display 94 or other of the control elements 24) to control various operations of the loader 10. For example, the graphic display 94 may present various graphical user interfaces (GUIs) that provides information to the operator and/or that facilitate interaction and control of the loader 10 by the operator. In embodiments in which the graphic display 94 is a touchscreen, the GUIs enable the operator to interact with the loader 10 by touching or pointing at display areas of the GUI. In some other embodiments, the operator will interact with the GUIs and/or the loader by manipulating interactable graphical icons/elements that are associated with the graphic display 94. The functionality of the graphic display 94 will be described in more detail below.

As illustrated in FIGS. 15*a* and 15*b*, the graphic display 94 may be coupled to an end of a rotatable lap bar 96. As such, the graphic display 94 and the lap bar 96 may be selectively shiftable between a raised, non-operable position (i.e., FIG. 15*b*) to and a lowered, operating position (i.e., FIG. 15*a*). In the raised, non-operable position, the graphic display 94 and the lap bar 96 are rotated away from the seat 21 such that space is provided for the operator to access or disembark from the seat 21. Once the operator has sat down in the seat 21, the graphic display 94 and the lap bar 96 can be rotated down towards the seat, such that the graphic display 94 is positioned in the lap area of the operator. As such, the operator can easily interact with the graphic display 94 to obtain information for and/or control functions of the loader 10. In some embodiments, the loader 10 may include a position sensor associated with the lap bar 96 and configured to determine if the lap bar 96 is in either the raised, non-operable position or the lowered, operating position. In some embodiments, certain functions of the loader 10 may not be operable unless the lap bar 96 is in the lowered, operating position. In addition, some embodiments may provide for the seat 21 to include a presence sensor configured to determine whether an operator is seated in the seat 21. In some embodiments, certain functions of the loader 10 may not be operable unless the operator is seated. The above-described position/presence sensors may comprise electronic sensors, such an inductive proximity switch configured to be triggered by the position of the lap bar and/or weight of the operator present in the seat 21. Thus, the loader 10 is configured to determine whether or not an operator is positioned within the seat 21 and with the lap bar 96 in the lowered, operating position. In some embodiments, certain operational features of the loader 10 may be restricted (e.g., starting the engine 30 of the loader, maneuvering the loader 10, actuating the loader arms 16 and/or attachment 18, etc.) if an operator is not present in the seat 21 and/or the lap bar 96 is not positioned in the lowered, operating position.

Motor Mount Assembly

As discussed previously, the loader 10 may include a pair of hydraulically-powered drive motors 38 that propel the tracks 50 of the loader's 10 drive assembly 14. Specifically, the left-side drive motor 38 may be positioned on the left side of the loader 10 to propel the left-side track 50, while the right-side drive motor 38 may be positioned on the right side of the loader 10 to propel the right-side track 50. Embodiments of the present invention beneficially includes a motor mount assembly that can be used to efficiently install, support, and/or remove the drive motors 38 with respect to the frame 12 of the loader 10, while facilitating appropriate load transfer between the drive assembly 14 (e.g., the tracks 50, sprockets 58, and/or drive motors 38) and the frame 12 of the loader 10.

Figure 16:
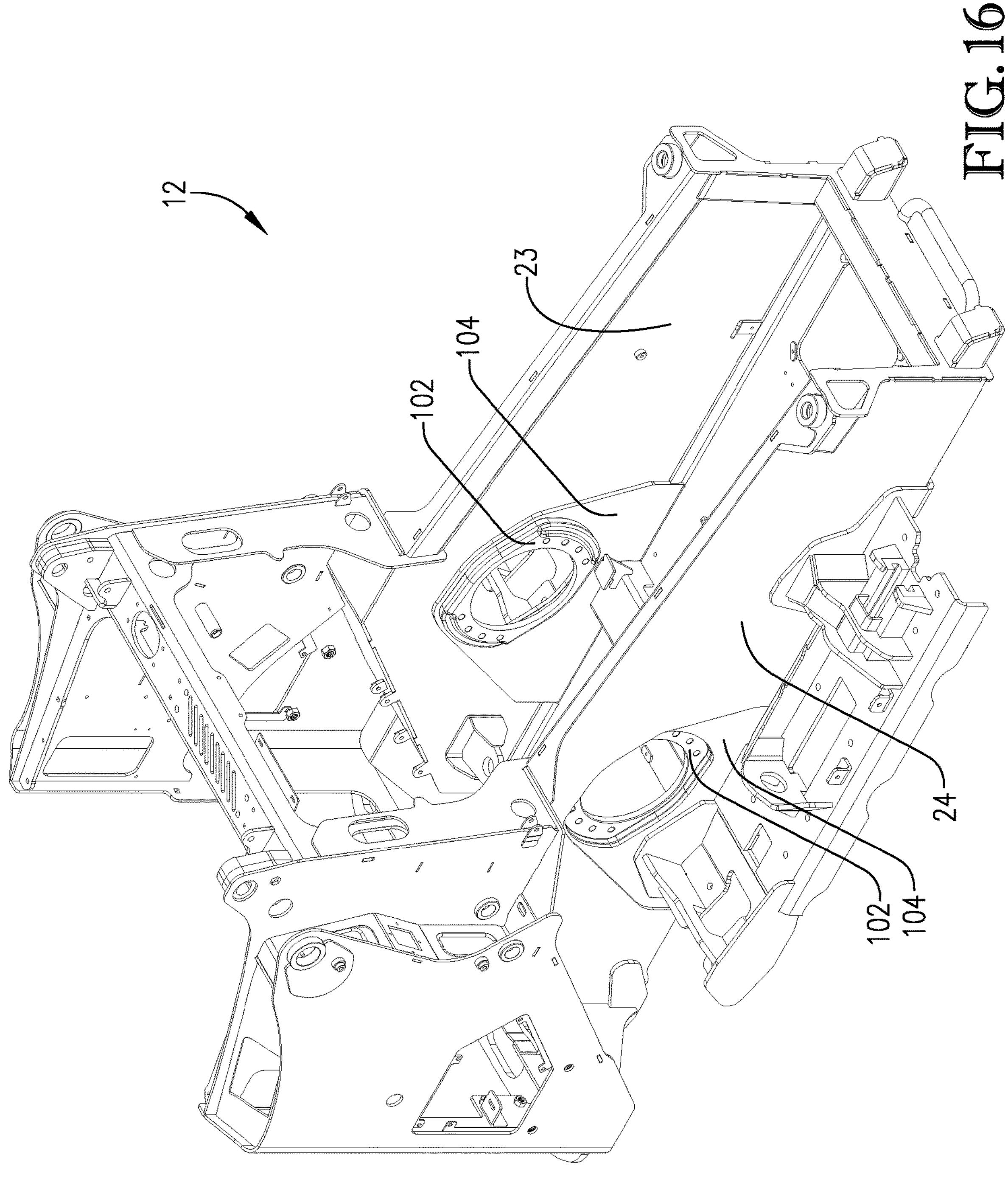
FIG. 16 is a right side perspective view of a frame of the loader from FIGS. 1-8, with a motor mounting assembly secured to the frame and configured to support drive motors of the loader.
Figure 17:
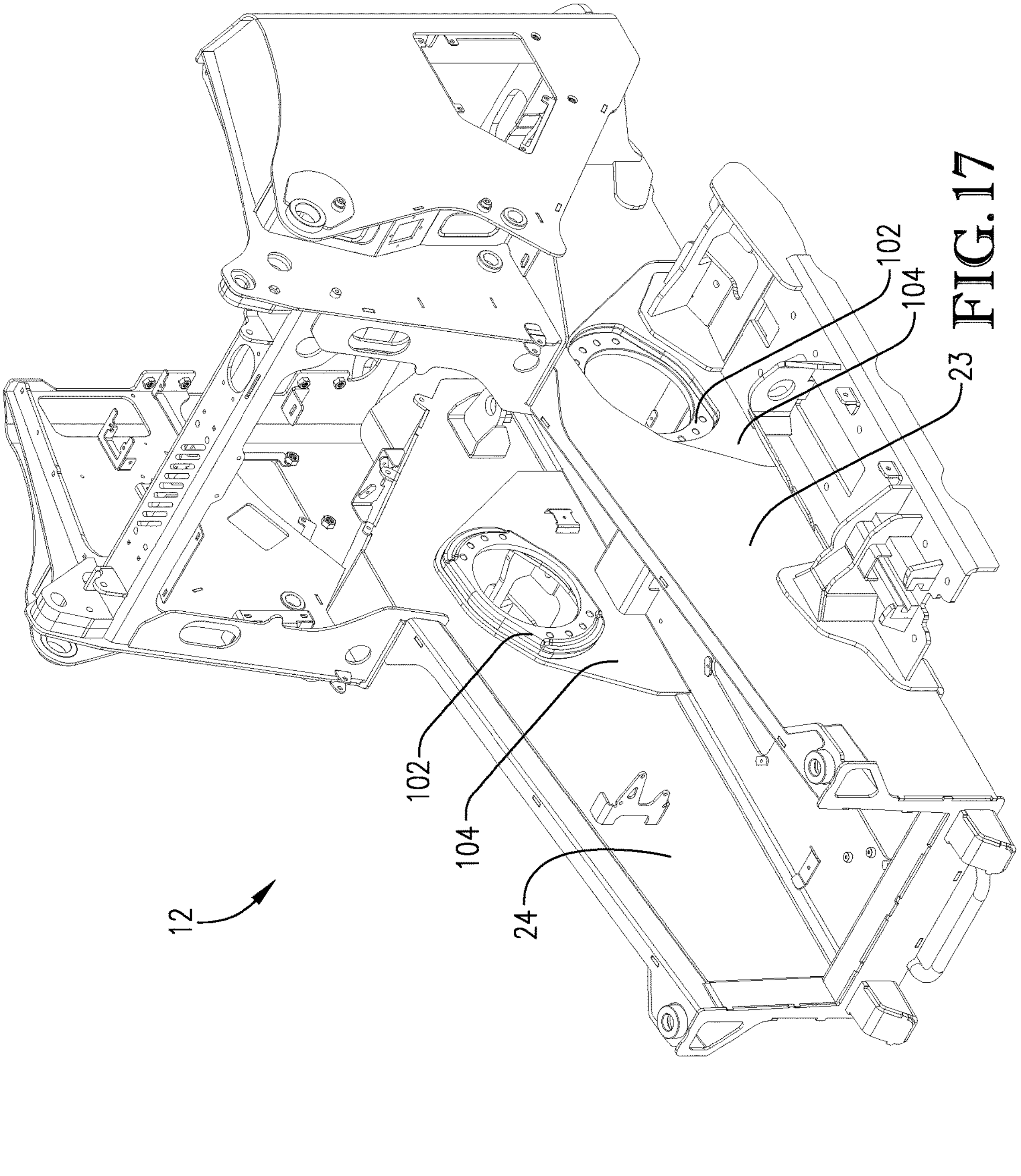
FIG. 17 is a left side perspective view of the frame of the loader from FIG. 16.

In more detail, the motor mount assembly may, as illustrated in FIGS. 16 and 17 comprise one or more mounting flanges 102 and one or more reinforcement elements, which may be in the form of reinforcement plates 104. In certain embodiments, the motor mount assembly will include one mounting flange 102 and one reinforcement plate 104 for each drive motor 38 associated with the loader 10. For example, the loader 10 described herein includes a pair of drive motors 38, in the form of a left-side drive motor 38 and a right-side drive motor 38. As such, a first combination of mounting flange 102 and reinforcement plate 104 can be used to mount the left-side drive motor 30 to the left side 23 of the frame 12, and a second combination of mounting flange 102 and reinforcement plate 104 can be used to mount the right-side drive motor 38 to the right side 24 of the frame 12.

Figure 18:
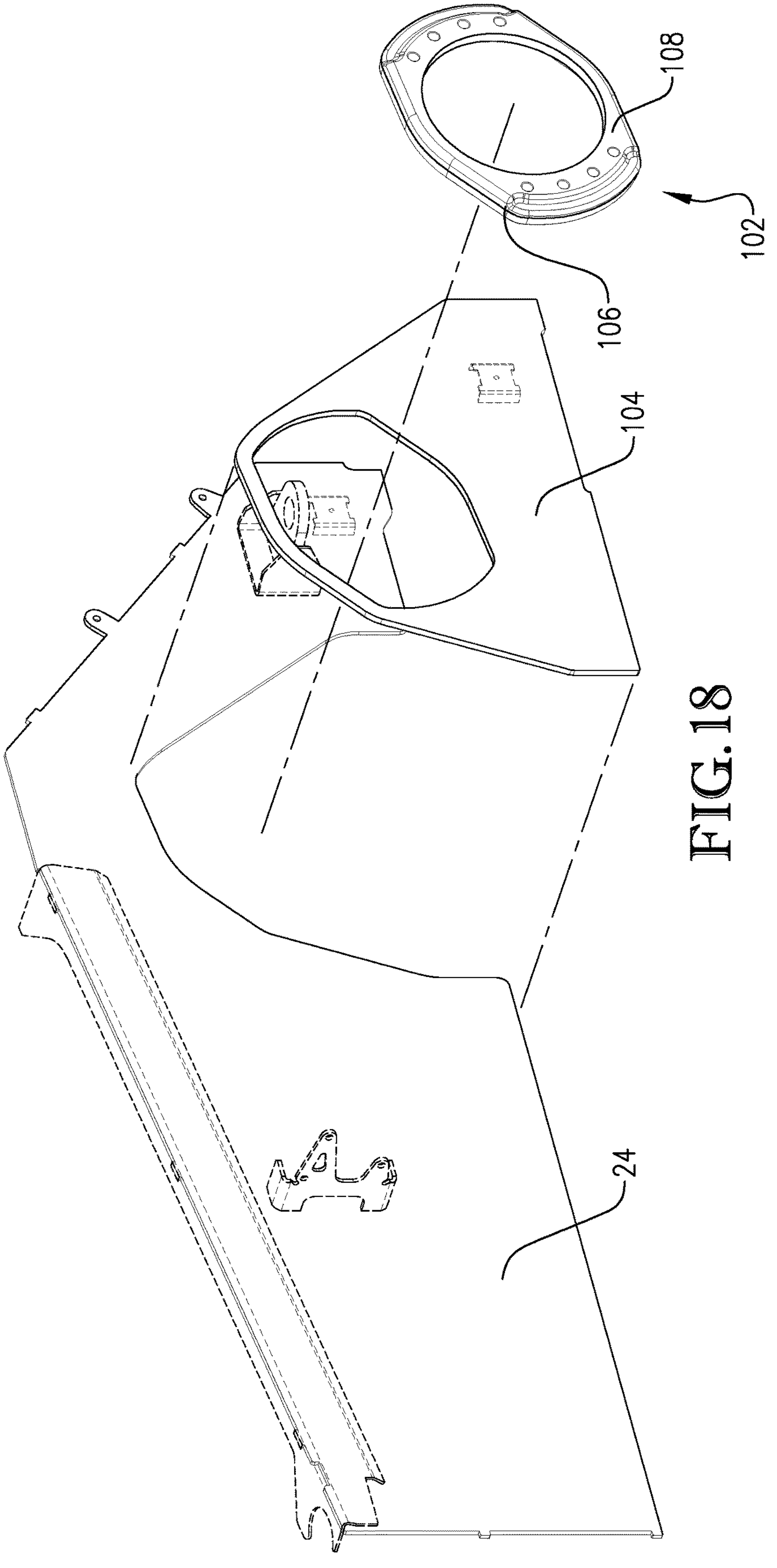
FIG. 18 is a perspective view of an interior of a right side panel of the frame of the loader from FIGS. 16 and 17, with portions of the motor mounting assembly shown separated from the right side panel.
Figure 19:
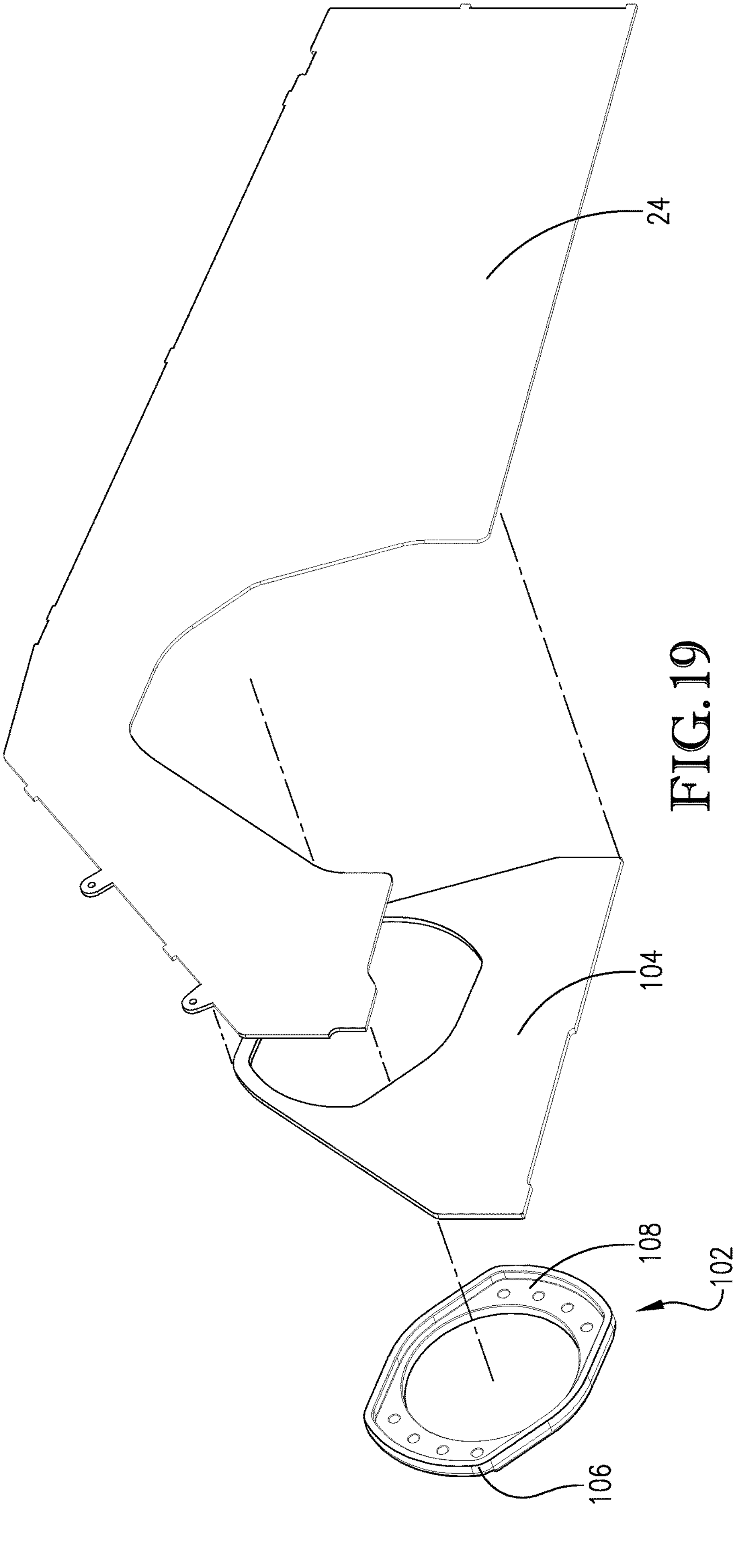
FIG. 19 is a perspective view of an exterior of the right side panel and the separated motor mounting portions from FIG. 18.

Turning to the mounting flanges 102 in more detail, as perhaps best illustrated in FIGS. 18 and 19, each mounting flange 102 may have a disc shape (e.g., round, circular, oval, or the like) with a relatively large, central opening (i.e., a motor opening) present through a center of the mounting flange 102. As such, the mounting flange 102 may have an inner diameter and an exterior diameter. The inner diameter, and thus the motor opening of the mounting flange 102, may be sized so as to be configured to receive at least a portion of one of the drive motors 38. The exterior diameter of the mounting flange 102 may be sized so as to be engageable with a mounting surface of the drive motor 38. In some embodiments, the mounting flange 102 may include a plurality of threaded holes or openings located around a periphery of the mounting flange 102, such that fasteners may extend through the drive motor 38 and into the mounting flange 102 to secure the drive motor 38 to the mounting flange 102.

In more detail, the material forming the mounting flange 102, which extends between the inner diameter and the outer diameter, may comprise an outer portion 106 that extends around the outer edges of the mounting flange 102. The outer portion 106 may include a mounting surface on an exterior side of the mounting flange 102, with such mounting surface being configured to engage with the corresponding reinforcement plate 104, as will be discussed in more detail below.

The mounting flange 102 may additionally comprise an inner portion 108 that extends inward (from the outer portion 106 towards a center of the motor opening of the mounting flange 102) and presents a motor mounting surface, on an exterior of the mounting flange 102, that is configured to engage with a corresponding portion of a drive motor 38 to mount the drive motor 38 to the mounting flange 102, as will be discussed in more detail below. The inner portion 108 of the mounting flange 102 may include a plurality of threaded holes, as previously discussed, for receiving fasteners that may be used to couple the drive motor 38 to the mounting flange 102.

The mounting flange 102 may be formed in various sizes as necessary for particular operational requirements; however, in some embodiments, the mounting flange 102 may be formed with a thickness between 1.0 to 1.5 inches or about 1.125 inches, with the outer portion 106 having a thickness corresponding to the total thickness of the mounting flange 102 (i.e., 1.0 to 1.5 inches or about 1.125 inches) and the inner portion 108 being recessed with respect to the outer portion 106, e.g., having a thickness between 0.5 to 0.6 inches or about 0.535 inches. Thus, the outer portion 106 will, in some embodiments, be thicker than the inner portion 108.

Turning to the reinforcement plate 104 in more detail, and remaining with FIGS. 18 and 19, the reinforcement plate 104 may comprise an element in the form of a generally flat section of material that is configured to be positioned between the mounting flange 102 and the frame 12 of the loader 10 so as to provide structural support for the mounting flange 102 and a drive motor 38 (as well as a sprocket 58 and track 50) secured thereto. Although the reinforcement plate 104 is shown and described as being flat and plate-like, it should be understood that the reinforcement plate 104 (or reinforcement element more generally) may be alternatively configured with various or variable thicknesses that are not required to be strictly flat. Furthermore, gussets or other structural buttresses may be used. However, flat reinforcement plates 104 provide the benefit of facilitating necessary reinforcement functions, while minimizing the amount of space needed to incorporate the reinforcement plates into the loader 10.

The reinforcement plate 104 may be formed in various shapes, such as quadrilateral, triangular, semi-circular or the like. However, in some embodiments, a base or bottom portion of the reinforcement plate 104 may be longer/wider than a top or upper portion of the reinforcement plate 104. Furthermore, the reinforcement plate 104 may include an opening (i.e., a motor opening) present within a center portion of the reinforcement plate 104. Such motor opening should generally be sized so as to receive at least a portion of a drive motor 38, as discussed below. The reinforcement plate 104 may be formed in various sizes as necessary for particular operational requirements; however, in some embodiments, the reinforcement plate may be formed with a thickness of around 0.535 inches, which is generally larger than a thickness of the sidewalls of the frame 12 (e.g., the left side 23 and/or the right side 24). For example, in some embodiments, the sidewalls of the frame 12 will have a thickness of around 0.300 inches.

The mounting flange 102 may be formed from a material that is different than a material from which the frame 12 and/or the reinforcement plate 104 are formed. For example, the mounting flange 102 may be formed from ASTM A27, or cast steel, whereas the frame 12 and/or the reinforcement plate 104 may be formed from A36 steel. As such, the mounting flange 102 may be formed from a lighter material than the frame 12 and/or the reinforcement plate 104. Such material differences permit the mounting flange 102 to be manufactured via casting (e.g., pouring molten metal into a mold to form a finished part) or forging, whereas the frame 12 and/or the reinforcement plate 104 may generally be formed from hot rolling and/or a milling process.

Generally, to secure a drive motor 38 to a motor mount assembly, the motor mount assembly will first be secured to the frame 12 of the loader 10. It should be noted, however, that the order of the steps detailed below may be switched or changed without departing from the scope of the invention. In more detail, a reinforcement plate 104 may first be secured to one of the sidewalls (e.g., left side 23 or right side 24) of the frame 12 of the loader 10. Specifically, an exterior surface of the reinforcement plate 104 may be engaged with an interior surface of one of the sidewalls of the frame 12 of the loader 10. Generally, each of the sidewalls will include openings, cutouts, or open portions (i.e., a motor openings) that are sized to receive at least a portion of a drive motor 38. As such, the reinforcement plate 104 should be engaged with one of the sidewalls, such that the motor opening of the reinforcement plate 104 is aligned with the motor opening of the sidewall. In such a configuration, the reinforcement plate 104 can be secured to the sidewall via welding (e.g., continuous or skip welding) extending along the edges of the reinforcement plate 104, between the reinforcement plate 104 and the sidewall (e.g., left side 23 or right side 24).

After securing the reinforcement plate 104 to the interior surface of the sidewall, the mounting flange 102 can be secured to the interior surface of the reinforcement plate 104. However, as indicated above, it should be understood that the order of certain steps described herein may be changed. For example, the mounting flange 102 may be secured to the reinforcement plate 104 prior to the reinforcement plate 104 being secure to the sidewall. Nevertheless, the mounting surface of the exterior of the outer portion 106 of the mounting flange 102 may be engaged with an interior surface of the reinforcement plate 104. As such, in some embodiments, the mounting flange 102 will not directly contact or be directly engaged with the frame 12 (e.g., the left side 23 or right side 24) of the loader 10. The mounting flange 102 should be engaged with the reinforcement plate 104, such that the motor opening of the mounting flange 102 is aligned with the motor opening of the reinforcement plate 104. In such a configuration, the mounting flange 102 can be secured to the reinforcement plate 104 via welding (e.g., continuous or skip welding) extending along the edges of the mounting flange 102, between the outer portion 106 of the mounting flange 102 and the reinforcement plate 104.

Figure 20:
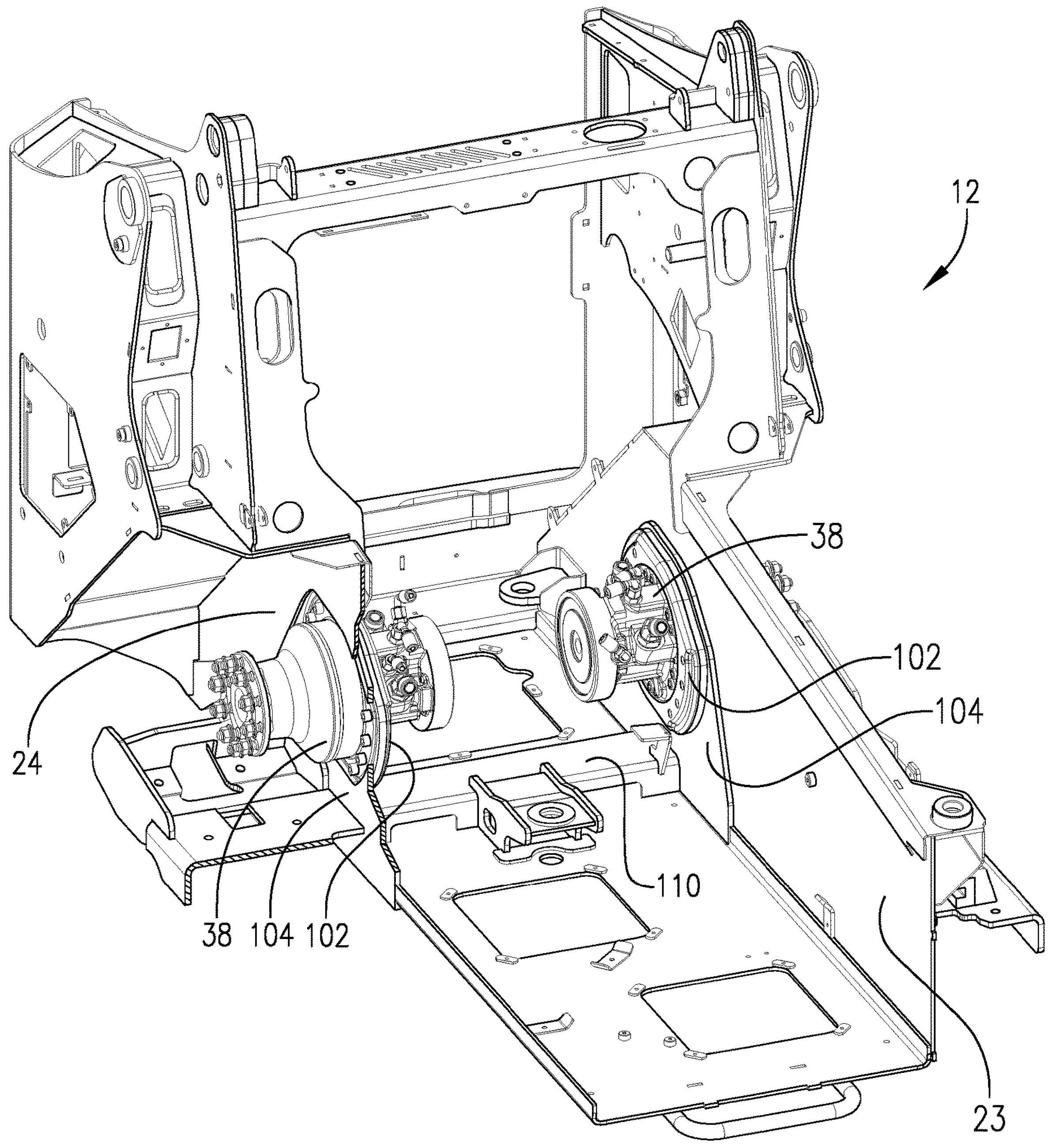
FIG. 20 is a front perspective of the frame of the loader from FIGS. 16 and 17, with drive motors attached to the frame.

As noted above, the motor mount assembly may include a mounting flange 102 and a reinforcement plate 104 pair for each drive motor 38 associated with the loader 10. For example, and as illustrated in FIG. 20, the loader 10 includes two drive motors 38 (i.e., a left-side drive motor 38 and a right-side drive motor 38). Each drive motor 38 is secured to the frame 12 of the loader 10 via a mounting flange 102 and a reinforcement plate 104, such that the mount assembly of the loader 10 includes two mounting flanges 102 and two reinforcement plates 104. Specifically, a first reinforcement plate 104 is secured to the interior of the left side 23 of the frame 12, and a first mounting flange 102 is secured to the interior of the first reinforcement plate 104, as described above.

As such, a left-side drive motor 38 can be engaged with the frame 12 (via the motor mount assembly) by inserting the drive motor 38 through the motor openings of each of the left side 23 of the frame 12, the first reinforcement plate 104, and the first mounting flange 102, such that (i) the through holes of the left-side drive motor 38 are aligned with the threaded holes of the inner portion 108 of the first mounting flange 102, and (ii) the left-side drive motor 38 engages with the motor mounting surface on the exterior of the inner portion 108 of the first mounting flange 102. In such a configuration, the left-side drive motor 38 can be securely fastened to the mounting flange 102 (and thus the left side 23 of the frame 12) via fasteners (e.g., threaded fasteners and/or nut and bolt combinations) extending through the aligned through holes of the drive motor 38 and the threaded holes of the mounting flange 102. In such a configuration, an interior portion of the left-side drive motor 38 will extend inside the interior space of the frame 12, such that hydraulic hoses can be connected from the hydrostatic transmission 34 to the left-side drive motor 38. And an exterior portion of the left-side drive motor 38 will extend outward from the frame 12 so as to engage with and the left-side sprocket 58 so as to be configured to actuate the left-side track 50.

Similarly, a second reinforcement plate 104 is secured to the interior of the right side 24 of the frame 12, and a second mounting flange 102 is secured to the interior of the second reinforcement plate 104, as previously described. As such, a right-side drive motor 38 can be engaged with the frame 12 (via the motor mount assembly) by inserting the drive motor 38 through the motor openings of each of the right side 24 of the frame 12, the second reinforcement plate 104, and the second mounting flange 102, such that (i) the through holes of the right-side drive motor 38 are aligned with the threaded holes of the inner portion 108 of the second mounting flange 102, and (ii) the right-side drive motor 38 engages with the motor mounting surface on the exterior of the inner portion 108 of the second mounting flange 102. In such a configuration, the right-side drive motor 38 can be securely fastened to the second mounting flange 102 (and thus the right side 24 of the frame 12) via fasteners (e.g., threaded fasteners and/or nut and bolt combinations) extending through the aligned through holes of the drive motor 38 and the threaded holes of the mounting flange 102. In such a configuration, an interior portion of the right-side drive motor 38 will extend inside the interior space of the frame 12, such that hydraulic hoses can be connected from the hydrostatic transmission 34 to the right-side drive motor 38 (the loader 10 may include a pair of hydrostatic transmissions 34, with one associated with each drive motor 38). An exterior portion of the right-side drive motor 38 will extend outward from the frame 12 so as to engage with and the right-side sprocket 58 so as to be configured to actuate the right-side track 50.

Notably, by having the motor mount assembly positioned on the interior side of the sidewalls of the frame 12 (i.e., the interior sides of the left side 23 and right side 24 of the frame 12), dirt, mud, and other debris can be inhibited from entering into the interior space of the frame 12. Specifically, because each of the drive motors 38(*i*) extend through the motor openings of the frame 12, the reinforcement plate 104, and the mounting flange 102, and (ii) securely engage with the motor mounting surface formed on the lip portion 108 of the mounting flange 102, such a configuration essentially seals off the motor openings so as to close off any available pathway for dirt, mud, and other debris to pass through the frame 12 from outside the loader 10 to the interior space of the frame 12 of the loader 10.

The above-described motor mounting assembly is particularly configured to effectively transfer loads from the drive assembly 14 of the loader 10 (e.g., from/through the tracks 50, sprockets 58, and/or drive motors 38) to the frame 12 without creating significant stress concentrations through the components of the loader 10. In more detail, the use of the reinforcement plates 104, which are generally thicker than the sidewalls of the frame 12 (i.e., the left side 23 and right side 24), permit loads received from the tracks 50, sprockets 58, and/or drive motors 38 (via the mounting flanges 102) to be distributed over large areas of the frame 12. In certain embodiments, such as illustrated in FIG. 20, the loader 10 may further include a support element 110, such as section of reinforcing channel tubing, that extends across the bottom side 26 of the frame between the reinforcement plates 104 on each of the left side 23 and right side 24 of the frame. Such a support element further aids in reinforcing the frame 12 of the loader 10 by distributing loads about the frame 12 (e.g., from/through the tracks 50, sprockets 58, drive motors 38, mounting flange 102, and/or reinforcement plates 104).

In addition, by using a relatively lighter material to form the mounting flange 102, the mounting flange 102 can be formed from a casting process, which facilitates more efficient manufacturing of parts having complex shapes. For instance, via casting, the mounting flange 102 can be formed with fewer sharp edges (which can damage hydraulic components and other vulnerable parts) without requiring extensive, time-consuming milling operations. Furthermore, the mounting flange 102 can be formed, via casting, to fit specific size/shape requirements of the drive motors 38. For instance, in some embodiments, the drive motors 38 may comprise a two-speed, radial piston hydraulic motors configured to operate at (or about): a displacement of 560 cubic centimeters per revolution; a max pressure of 450 bar; a corner power of 107.7 kW; a flow rate of 13.4 gallons per minute; and/or a max shaft speed of 118 revolutions per minute. Nevertheless, embodiments may provide for the mounting flange 102 to be configured for use with other types of hydraulic motors having various other specifications and/or sizes/shapes.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

What is claimed is:

1. A work machine comprising:

a frame comprising a pair of spaced apart side panels separated by a bottom panel;

a drive assembly configured to propel the work machine, wherein the drive assembly comprises at least one drive motor; and a motor mount assembly configured to support the drive motor with respect to the frame, wherein the motor mount assembly comprises a mounting flange and a reinforcement element, wherein each of the mounting flange and the reinforcement element includes an opening configured to receive a portion of the drive motor, wherein the reinforcement element is secured to an interior surface of one of the side panels, wherein the mounting flange is secured to the reinforcement element, and wherein the drive motor is secured to the mounting flange, wherein the mounting flange has a rounded shape and comprises an outer portion and an inner portion, wherein the inner portion presents a motor engaging surface configured to engage with a portion of the drive motor, wherein the inner portion of the mounting flange includes a plurality of threaded holes configured to receive fasteners for securely coupling the drive motor to the mounting flange, and wherein the drive motor is coupled to an exterior surface of the mounting flange.

2. The work machine of claim 1, wherein the mounting flange is secured to an interior surface of the reinforcement element.

3. The work machine of claim 2, wherein the mounting flange does not contact the frame of the work machine.

4. The work machine of claim 2, wherein the mounting flange is welded to the reinforcement element.

5. The work machine of claim 1, wherein the reinforcement element comprises a reinforcement plate that is welded to the one of the side panels.

6. The work machine of claim 1, wherein the mounting flange is formed from a different material than a material from which the frame and/or the reinforcement element are formed.

7. The work machine of claim 6, wherein the mounting flange is formed by casting or forging, whereas the frame and/or the reinforcement element are formed by hot rolling or milling.

8. The work machine of claim 1, wherein the mounting flange is a casting-formed part.

9. The work machine of claim 1, wherein the reinforcement element is a first reinforcement element and is secured to a first of the pair of side panels, wherein the mounting flange is a first mounting flange, and wherein the drive motor is a first drive motor of the at least one drive motors, wherein the motor mount assembly further comprises a second reinforcement element secured to an interior surface of a second side panel of the pair of side panels, a second mounting flange secured to the second reinforcement element, and a second drive motor secured to the second mounting flange.

10. The work machine of claim 9, further comprising a support element extending across the bottom panel of the frame between each of the first and second reinforcement elements.

11. The work machine of claim 1, wherein an interior portion of the drive motor is positioned within an interior space of the work machine presented by the frame, and wherein an exterior portion of the drive motor is positioned outside of the interior space.

12. The work machine of claim 1, wherein the drive motor comprises a hydraulic motor.

13. The work machine of claim 1, wherein the drive assembly further comprises a track, and wherein the drive motor is configured to actuate the track.

14. The work machine of claim 13, wherein the drive assembly further comprises a sprocket positioned between the drive motor and the track, and wherein the drive motor is configured to actuate the track by rotating the sprocket.

15. The work machine of claim 1, wherein the work machine comprises a loader.

16. The work machine of claim 15, wherein the loader comprises a compact track loader.

17. A method of assembling a work machine, said method comprising:

(a) securing a reinforcement element to an interior surface of a side panel of a frame of the work machine;

(b) securing a mounting flange to the reinforcement element, wherein each of the mounting flange and the reinforcement element includes a motor opening configured to receive a portion of a drive motor of the work machine; and (c) securing the drive motor to the mounting flange, wherein the mounting flange has a rounded shape and comprises an outer portion and an inner portion, wherein the inner portion presents a motor engaging surface configured to engage with a portion of the drive motor, wherein the inner portion of the mounting flange includes a plurality of threaded holes configured to receive fasteners for securely coupling the drive motor to the mounting flange, and wherein the drive motor is coupled to an exterior surface of the mounting flange.

* * * * *